United States Patent
Wang et al.

(10) Patent No.: US 12,143,956 B2
(45) Date of Patent: Nov. 12, 2024

(54) COMMUNICATION METHOD AND APPARATUS

(71) Applicant: HUAWEI TECHNOLOGIES CO., LTD., Guangdong (CN)

(72) Inventors: Xiaolu Wang, Hangzhou (CN); Hejia Luo, Hangzhou (CN); Chenlei Xu, Hangzhou (CN); Jianwei Zhou, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 17/825,817

(22) Filed: May 26, 2022

(65) Prior Publication Data

US 2022/0295434 A1    Sep. 15, 2022

Related U.S. Application Data

(63) Continuation of application No. PCT/CN2020/131567, filed on Nov. 25, 2020.

(30) Foreign Application Priority Data

Nov. 29, 2019   (CN) .............................. 201911205253

(51) Int. Cl.
*H04W 56/00*   (2009.01)
*H04W 16/28*   (2009.01)
(Continued)

(52) U.S. Cl.
CPC ......... *H04W 56/006* (2013.01); *H04W 16/28* (2013.01); *H04W 36/0058* (2018.08);
(Continued)

(58) Field of Classification Search
CPC ............... H04W 56/006; H04W 16/28; H04W 36/0058; H04W 36/0072; H04W 56/005;
(Continued)

(56) References Cited

U.S. PATENT DOCUMENTS

| | | | |
|---|---|---|---|
| 2004/0090935 A1* | 5/2004 | Courtney | H04W 36/0009 370/331 |
| 2016/0198375 A1* | 7/2016 | Sundberg | H04L 5/1469 370/280 |

(Continued)

FOREIGN PATENT DOCUMENTS

| | | |
|---|---|---|
| CN | 101022668 A | 8/2007 |
| CN | 103220773 A | 7/2013 |

(Continued)

OTHER PUBLICATIONS

Cao, Zizheng, et al. "Advanced integration techniques on broadband millimeter-wave beam steering for 5G wireless networks and beyond." IEEE journal of quantum electronics 52.1 (2015): 1-20. (Year: 2015).*

(Continued)

*Primary Examiner* — Sharad Rampuria
(74) *Attorney, Agent, or Firm* — Fish & Richardson P.C.

(57) ABSTRACT

Example communication methods and apparatus are described. In one example method, a terminal receives a first information by using a serving beam, where the first information indicates a delay compensation parameter corresponding to a target beam. The target beam and the serving beam are different beams. The terminal determines, based on a full timing advance and the delay compensation parameter corresponding to the target beam, a differential timing advance corresponding to the target beam.

12 Claims, 9 Drawing Sheets

(51) Int. Cl.
*H04W 36/00* (2009.01)
*H04W 84/06* (2009.01)

(52) U.S. Cl.
CPC ..... *H04W 36/0072* (2013.01); *H04W 56/005* (2013.01); *H04W 84/06* (2013.01)

(58) Field of Classification Search
CPC .............. H04W 84/06; H04W 56/0045; H04B 7/18541; H04B 7/18513; H04B 7/18519
See application file for complete search history.

(56) References Cited

U.S. PATENT DOCUMENTS

2019/0045468 A1* 2/2019 Blasco Serrano ........................... H04W 56/0015
2019/0313357 A1  10/2019 Wang et al.

FOREIGN PATENT DOCUMENTS

| CN | 103535109 A | 1/2014 |
| CN | 108810922 A | 11/2018 |
| CN | 109089309 A | 12/2018 |
| CN | 109302720 A | 2/2019 |
| CN | 109819511 A | 5/2019 |
| CN | 110418402 A | 11/2019 |
| EP | 3447936 A1 | 2/2019 |
| WO | 2016049860 A1 | 4/2016 |

OTHER PUBLICATIONS

CMCC, "Considerations on Timing Advance for Non-Terrestrial Networks," 3GPP TSG RAN WG1 #98bis, R1-1910165, Chongqing, China, Oct. 14-20, 2019, 4 pages.
Huawei et al., "Discussion on Doppler Compensation, Timing Advance and RACH for NTN," 3GPP TSG RAN WG1 Meeting #98bis, R1-1910064, Chongqing, China, Oct. 14-20, 2019, 8 pages.
Office Action issued in Chinese Application No. 201911205253.1 on Nov. 2, 2021, 14 pages (with English translation).
Panasonic, "Timing Advance and PRACH Design for NTN," 3GPP TSG RAN WG1 #99, R1-1912903, Reno, USA, Nov. 18-22, 2019, 13 pages.
PCT International Search Report and Written Opinion issued in International Application No. PCT/CN2020/131567 on Feb. 10, 2021, 17 pages (with English translation).
Samsung, "Uplink Timing Advance/RACH Procedure and Initial Access for NTN," 3GPP TSG RAN WG1 Meeting #99, R1-1912470, Reno, USA, Nov. 18-22, 2019, 12 pages.

* cited by examiner

COMMUNICATION METHOD AND APPARATUS

CROSS-REFERENCE TO RELATED APPLICATIONS

This application is a continuation of International Application No. PCT/CN2020/131567, filed on Nov. 25, 2020, which claims priority to Chinese Patent Application No. 201911205253.1, filed on Nov. 29, 2019. The disclosures of the aforementioned applications are hereby incorporated by reference in their entireties.

TECHNICAL FIELD

This application relates to the field of communication technologies, and in particular, to a communication method and apparatus.

BACKGROUND

In current non-terrestrial network (NTN) communication, a network device such as a base station or a relay device may be placed on an unmanned aerial vehicle platform, a high-altitude platform, a satellite platform, or the like. A difference from a terrestrial network lies in that, the network device in the NTN communication may be hundreds or even tens of thousands of kilometers away from the earth's surface, which causes a relatively large round trip delay.

As shown in FIG. 1, if a coverage beam (or cell) of a satellite moves along with the satellite, even if a terminal (UE) does not move, the terminal still performs beam switching as the beam moves. When the beam of the satellite is bound to ground (or in other words, a steerable mode is used), in a time window of coverage by the same satellite, the terminal does not need to perform a plurality of times of beam switching, as shown in FIG. 2. However, in the steerable mode, when the terminal moves from a coverage area of one beam to a coverage area of another beam, beam switching also occurs on the terminal. In addition, when a relative position of the terminal to the satellite changes, so that the terminal moves out of a coverage area of a beam of the current satellite and enters a coverage area of a beam of another satellite, beam switching also occurs.

Due to beam switching, a timing advance (TA) adjustment amount of the terminal, that is, a differential timing advance of the terminal (UE-specific differential TA), changes. However, currently, the terminal cannot learn an accurate differential timing advance after beam switching. As a result, a timing for uplink sending deviates from a timing on a satellite base station side, and an uplink is interrupted.

SUMMARY

This application provides a communication method and apparatus, to improve stability of an uplink in NTN communication.

According to a first aspect, this application provides a communication method. The communication method may be performed by a terminal such as a mobile phone or a chip in the terminal.

According to the method, the terminal may receive first information by using a serving beam. The first information may be used to indicate a delay compensation parameter corresponding to a target beam, and the serving beam and the target beam are different beams. In addition, the terminal may determine, based on the delay compensation parameter corresponding to the target beam and a full timing advance, a differential timing advance corresponding to the target beam.

With the foregoing method, the terminal may obtain, from a currently accessed network device, the delay compensation parameter corresponding to the target beam that is about to be accessed, so that the terminal may determine, based on the full timing advance and the delay compensation parameter corresponding to the target beam, the differential timing advance corresponding to the target beam, to perform delay compensation and initiate uplink random access on the target beam. Therefore, continuity of an uplink can be maintained before and after beam switching, to improve communication reliability of the uplink.

For example, the first information comes from a network device corresponding to the serving beam.

For example, the serving beam is a beam used by the terminal to currently access the network device, and the target beam is a beam to which the terminal is about to be switched.

In a specific example, the terminal may determine the full timing advance based on location information of the terminal and location information of a target satellite. The target satellite corresponds to the target beam, or in other words, the target satellite is a satellite that transmits the target beam. In this example, the terminal may further receive the location information of the target satellite. For example, the terminal may receive the location information of the target satellite from the network device.

In another example, the terminal may determine the full timing advance based on a delay compensation parameter corresponding to the serving beam and a differential timing advance corresponding to the serving beam.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part (BWP) signaling, non-initial BWP signaling, neighboring cell measurement configuration signaling, or inter-cell handover signaling. The non-initial BWP signaling may include any one or more of BWP downlink common (BWP-DownlinkCommon) signaling, BWP uplink common (BWP-UplinkCommon) signaling, BWP downlink dedicated (BWP-DownlinkDedicated) signaling, or BWP uplink dedicated (BWP-UplinkDedicated) signaling.

According to a second aspect, an embodiment of this application provides a communication method. This method may be performed by a network device or a chip in the network device. The network device may include an access network device, for example, a satellite that serves as a network device or a ground station that serves as a network device.

According to the method, the network device may determine a delay compensation parameter corresponding to a target beam. The delay compensation parameter corresponding to the target beam may be used to determine a differential timing advance corresponding to the target beam. The network device may send first information by using a serving beam. The first information may be used to indicate the delay compensation parameter corresponding to the target beam, and the serving beam and the target beam are different beams.

For example, the serving beam is a beam used by a terminal to currently access the network device, and the target beam is a beam to which the terminal is about to be switched.

In a possible example, the network device may further send location information of a target satellite to the terminal. The target satellite corresponds to the target beam. For example, when the target beam and the serving beam correspond to different satellites, the network device may send the location information of the target satellite.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

According to a third aspect, an embodiment of this application provides a communication method. The communication method may be performed by a terminal such as a mobile phone or a chip in the terminal.

According to the method, the terminal may receive second information by using a serving beam. The second information may be used to indicate a differential timing advance corresponding to a target beam, and the target beam and the serving beam are different beams. Then, the terminal may perform a timing advance based on the differential timing advance corresponding to the target beam.

With the foregoing method, a network device may determine a delay compensation parameter corresponding to the target beam that is about to be accessed by the terminal, and determine, based on a full timing advance and the delay compensation parameter corresponding to the target beam, the differential timing advance corresponding to the target beam. In addition, the network device may indicate the differential timing advance corresponding to the target beam to the terminal, so that the terminal can perform delay compensation based on the differential timing advance corresponding to the target beam, and initiate uplink random access on the target beam. Therefore, continuity of an uplink can be maintained, to improve communication reliability of the uplink.

For example, the second information comes from a network device corresponding to the serving beam.

In a possible example, the terminal may send location information of the terminal to the network device.

In another possible example, the terminal may send a differential timing advance of the serving beam to the network device.

The first information may be carried in one or more of signaling such as initial bandwidth part BWP signaling, non-initial BWP signaling, neighboring cell measurement configuration signaling, or inter-cell handover signaling.

According to a fourth aspect, an embodiment of this application provides a communication method. This method may be performed by a network device or a chip in the network device. The network device may include an access network device, for example, a satellite that serves as a network device or a ground station that serves as a network device.

According to the method, the network device may determine a delay compensation parameter corresponding to a target beam, and determine, based on a full timing advance of a terminal and the delay compensation parameter corresponding to the target beam, a differential timing advance corresponding to the target beam. The network device may further send second information by using a serving beam. The second information may be used to indicate the differential timing advance corresponding to the target beam.

In a possible example, the network device may receive location information from the terminal, and determine the full timing advance of the terminal based on the location information of the terminal and location information of a target satellite. The target satellite corresponds to the target beam. The location information of the terminal may come from the terminal.

In another possible example, the network device may receive a differential timing advance of the serving beam, and determine the full timing advance of the terminal based on a delay compensation parameter corresponding to the serving beam and the differential timing advance corresponding to the serving beam. The differential timing advance of the serving beam may come from the terminal.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

According to a fifth aspect, an embodiment of this application provides a communication method. The communication method may be performed by a terminal such as a mobile phone or a chip in the terminal.

According to the method, the terminal may receive third information by using a serving beam. The third information may be used to indicate a first parameter. In addition, the terminal may determine, based on the first parameter and a differential timing advance of the serving beam, a differential timing advance corresponding to a target beam. The serving beam and the target beam are different beams. The first parameter may include a difference between a delay compensation parameter corresponding to the serving beam and a delay compensation parameter corresponding to the target beam. Alternatively, the first parameter may include the delay compensation parameter corresponding to the target beam and the delay compensation parameter corresponding to the serving beam.

With the foregoing method, a network device may indicate the first parameter to the terminal, and the terminal determines, based on the first parameter and the differential timing advance of the serving beam, the differential timing advance corresponding to the target beam, to perform delay compensation and send uplink data on the target beam, so as to maintain continuity of an uplink.

For example, the third information comes from a network device corresponding to the serving beam.

The first information may be carried in one or more of signaling such as initial bandwidth part BWP signaling, non-initial BWP signaling, neighboring cell measurement configuration signaling, or inter-cell handover signaling.

According to a sixth aspect, an embodiment of this application provides a communication method. This method may be performed by a network device or a chip in the network device. The network device may include an access network device, for example, a satellite that serves as a network device or a ground station that serves as a network device.

According to the method, the network device may determine a first parameter. The first parameter may be used by the terminal to determine a differential timing advance corresponding to a target beam. The network device may send third information by using a serving beam. The third information may be used to indicate the first parameter. The serving beam and the target beam are different beams. The first parameter may include a difference between a delay compensation parameter corresponding to the serving beam and a delay compensation parameter corresponding to the target beam. Alternatively, the first parameter may include the delay compensation parameter corresponding to the target beam and the delay compensation parameter corresponding to the serving beam.

The first information may be carried in one or more of signaling such as initial bandwidth part BWP signaling, non-initial BWP signaling, neighboring cell measurement configuration signaling, or inter-cell handover signaling.

According to a seventh aspect, this application provides a communication apparatus. The communication apparatus may be configured to perform steps performed by the terminal in the first aspect or any possible design of the first aspect, the third aspect or any possible design of the third aspect, or the fifth aspect or any possible design of the fifth aspect. The communication apparatus may implement functions, steps, or operations in the foregoing methods by using a hardware structure, a software module, or a hardware structure plus a software module. For example, a function module corresponding to functions, steps, or operations in the foregoing methods may be disposed in the communication apparatus to support the communication apparatus in performing the foregoing methods.

When the communication apparatus shown in the seventh aspect is implemented by using the software module, the communication apparatus may include a communication module and a processing module that are coupled to each other. The communication module may be configured to support the communication apparatus in performing communication. The processing module may be used by the communication apparatus to perform a processing operation, for example, generate information/a message that needs to be sent, or process a received signal to obtain information/a message.

The communication module may be configured to perform a sending action and/or a receiving action of the terminal in the foregoing method, for example, configured to perform an action of sending information, a message, or signaling to a network device by the terminal, or configured to perform an action of receiving information, a message, or signaling from the network device; and/or the processing module may be configured to perform a processing action of the terminal in the foregoing method, for example, configured to control the communication module to receive and/or send information, a message, or signaling, store information, and perform other operations.

When the communication apparatus shown in the seventh aspect is implemented by using the hardware module, the communication apparatus may include a processor, configured to perform steps performed by the terminal in the first aspect or any possible design of the first aspect, the third aspect or any possible design of the third aspect, or the fifth aspect or any possible design of the fifth aspect. The communication apparatus may further include a memory. The memory may be configured to store instructions, and the processor may be configured to invoke the instructions from the memory and run the instructions, to perform steps performed by the terminal in the foregoing possible designs. The communication apparatus may further include a transceiver, used by the communication apparatus to perform communication. For example, the transceiver may be configured to perform a sending action and/or a receiving action of the terminal in the first aspect or any possible design of the first aspect, the third aspect or any possible design of the third aspect, or the fifth aspect or any possible design of the fifth aspect, for example, configured to perform an action of sending information, a message, or signaling to a network device by the terminal, or configured to perform an action of receiving information, a message, or signaling from the network device.

For example, the communication apparatus may be the terminal or a chip in the terminal.

According to an eighth aspect, an embodiment of this application provides a communication apparatus. The communication apparatus may be configured to perform steps performed by the network device in the second aspect or any possible design of the second aspect, the fourth aspect or any possible design of the fourth aspect, or the sixth aspect or any possible design of the sixth aspect. The communication apparatus may implement functions, steps, or operations in the foregoing methods by using a hardware structure, a software module, or a hardware structure plus a software module. For example, a function module corresponding to functions, steps, or operations in the foregoing methods may be disposed in the communication apparatus to support the communication apparatus in performing the foregoing methods.

When the communication apparatus shown in the eighth aspect is implemented by using the software module, the communication apparatus may include a communication module and a processing module that are coupled to each other. The communication module may be configured to support the communication apparatus in performing communication. The processing module may be used by the communication apparatus to perform a processing operation, for example, generate information/a message that needs to be sent, or process a received signal to obtain information/a message.

The communication module may be configured to perform a sending action and/or a receiving action of the terminal in the foregoing method, for example, configured to perform an action of sending information, a message, or signaling to a network device by the terminal, or configured to perform an action of receiving information, a message, or signaling from the network device: and/or the processing module may be configured to perform a processing action of the terminal in the foregoing method, for example, configured to control the communication module to receive and/or send information, a message, or signaling, store information, and perform other operations.

When the communication apparatus shown in the eighth aspect is implemented by using the hardware module, the communication apparatus may include a processor, configured to perform steps performed by the network device in the second aspect or any possible design of the second aspect, the fourth aspect or any possible design of the fourth aspect, or the sixth aspect or any possible design of the sixth aspect. The communication apparatus may further include a memory. The memory may be configured to store instructions, and the processor may be configured to invoke the instructions from the memory and run the instructions, to perform steps performed by the terminal in the foregoing possible designs. The communication apparatus may further include a transceiver, used by the communication apparatus to perform communication. For example, the transceiver may be configured to perform a sending action and/or a receiving action of the network device in the second aspect or any possible design of the second aspect, the fourth aspect or any possible design of the fourth aspect, or the sixth aspect or any possible design of the sixth aspect, for example, configured to perform an action of sending information, a message, or signaling to a terminal by the network device, or configured to perform an action of receiving information, a message, or signaling from the terminal.

For example, the communication apparatus may be the network device or a chip in the network device.

According to a ninth aspect, this application provides a communication system. The communication system may include the communication apparatus shown in the seventh aspect and the communication apparatus shown in the eighth aspect. The communication apparatus shown in the seventh aspect may include a software module and/or a hardware component. The communication apparatus shown in the eighth aspect may include a software module and/or a hardware component.

According to a tenth aspect, this application provides a computer-readable storage medium. The computer-readable storage medium stores instructions (or referred to as a program), and when the instructions are invoked and executed on a computer, the computer is enabled to perform the method in the first aspect or any possible design of the first aspect, the second aspect or any possible design of the second aspect, the third aspect or any possible design of the third aspect, the fourth aspect or any possible design of the fourth aspect, the fifth aspect or any possible design of the fifth aspect, or the sixth aspect or any possible design of the sixth aspect.

According to an eleventh aspect, this application provides a computer program product. The computer program product may include instructions, and when the computer program product runs on a computer, the computer is enabled to perform the method in the first aspect or any possible design of the first aspect, the second aspect or any possible design of the second aspect, the third aspect or any possible design of the third aspect, the fourth aspect or any possible design of the fourth aspect, the fifth aspect or any possible design of the fifth aspect, or the sixth aspect or any possible design of the sixth aspect.

According to a twelfth aspect, this application provides a chip and/or a chip system including a chip. The chip may include a processor. The chip may further include a memory (or storage module) and/or a transceiver (or communication module). The chip may be configured to perform the method in the first aspect or any possible design of the first aspect, the second aspect or any possible design of the second aspect, the third aspect or any possible design of the third aspect, the fourth aspect or any possible design of the fourth aspect, the fifth aspect or any possible design of the fifth aspect, or the sixth aspect or any possible design of the sixth aspect. The chip system may include the chip, or may include the chip and another discrete component, such as a memory (or storage module) and/or a transceiver (or communication module).

DESCRIPTION OF EMBODIMENTS

Figure 1:
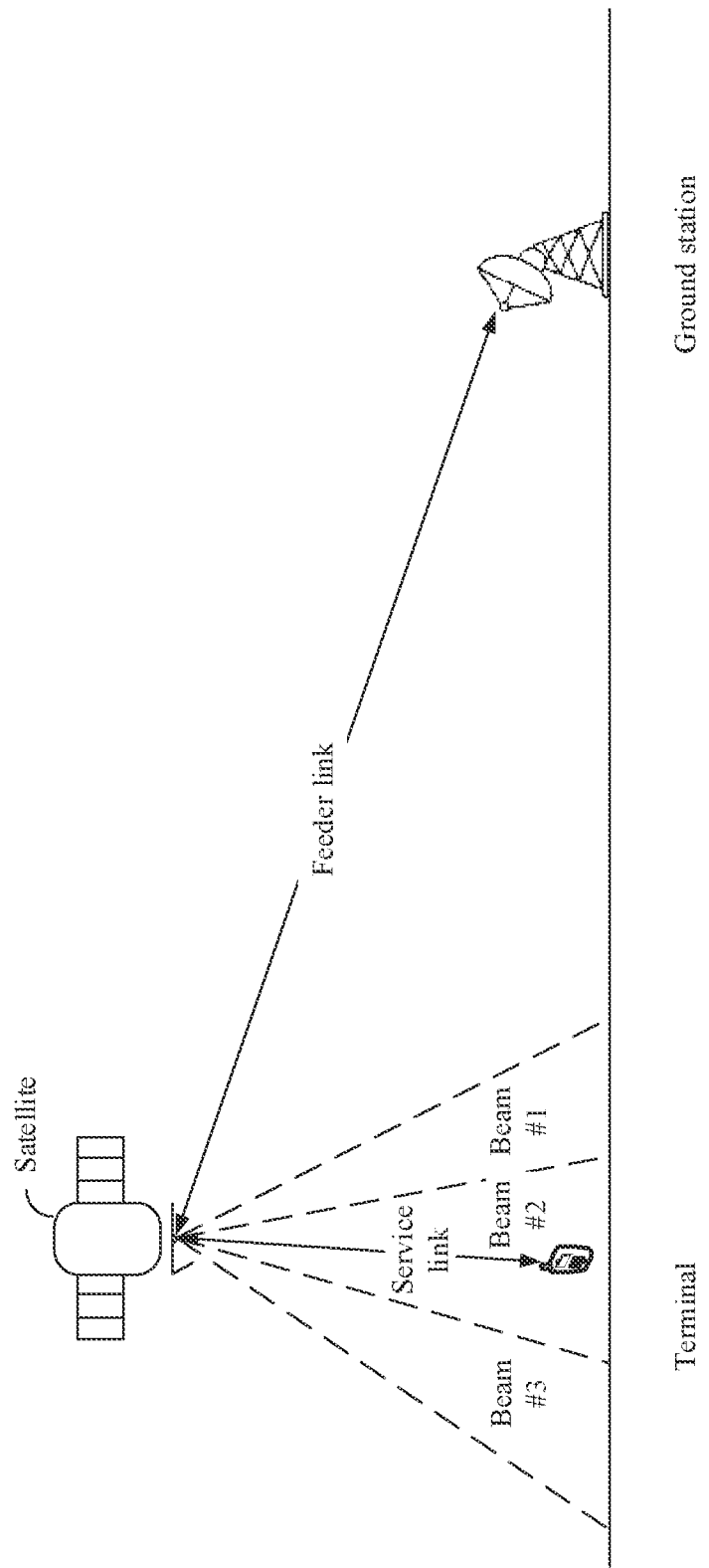
FIG. 1 is a schematic diagram of an architecture of an NTN communication system according to an embodiment of this application.

As shown in FIG. 1, a communication method provided in an embodiment of this application may be applied to an NTN communication system. The communication system may include a terminal (or referred to as a user terminal or user equipment), a satellite (or referred to as a satellite base station), and a ground station (or referred to as a gateway station) (gateway).

The terminal may be a wireless terminal device that can receive scheduling and indication information of a network device, such as a device configured to provide voice and/or data connectivity to a user, a handheld device with a wireless connection function, or other processing devices connected to a wireless modem. The wireless terminal device may communicate with one or more core networks or the internet through a radio access network (RAN). The wireless terminal device may be a mobile terminal device, for example a mobile phone (also referred to as a "cellular" phone or a mobile phone), a computer, or a communication chip. For example, the wireless terminal device may be a portable, pocket-sized, handheld, computer built-in, or in-vehicle mobile apparatus that exchanges language and/or data with the radio access network. The terminal may be specifically a device such as a personal communication service (PCS) phone, a cordless telephone set, a session initiation protocol (SIP) telephone, a wireless local loop (WLL) station, a personal digital assistant (PDA), a tablet computer (Pad), or a computer with a wireless transceiver function. Alternatively, the terminal may include a subscriber unit (subscriber unit), a subscriber station, a mobile station (MS), a remote station, an access point (AP), a remote terminal device (remote terminal), an access terminal device (access terminal), a user terminal device (user terminal), a user agent, a subscriber station (SS), customer premises equipment (CPE), a terminal, a mobile terminal (MT), and the like. Alternatively, the wireless terminal device may be a wearable device and a terminal device in a next-generation communication system such as a 5G network, a terminal device in a future evolved public land mobile network (PLMN), a terminal device in an NR communication system, or the like.

The satellite may provide a wireless access service for the terminal, schedule a radio resource for the terminal after access, provide a reliable wireless transmission protocol and data encryption protocol, and the like. The satellite may be an artificial earth satellite, a high-altitude vehicle, or the like serving as a base station for wireless communication, such as an evolved base station (eNB) or a 5G base station (gNB). Alternatively, the satellite may serve as a relay of the base station, and transparently transmit a radio signal of the base station to the terminal. In this case, the ground station may be considered as a base station for wireless communication. The satellite may be a geostationary earth orbit (GEO) satellite, a non-geostationary earth orbit (NGEO) such as a medium earth orbit (MEO) satellite or a low earth orbit (LEO) satellite, a high altitude platform station (HAPS), or the like.

Running attitudes of the satellite include an attitude of being non-steerable towards ground and an attitude of being steerable towards ground.

Figure 2:
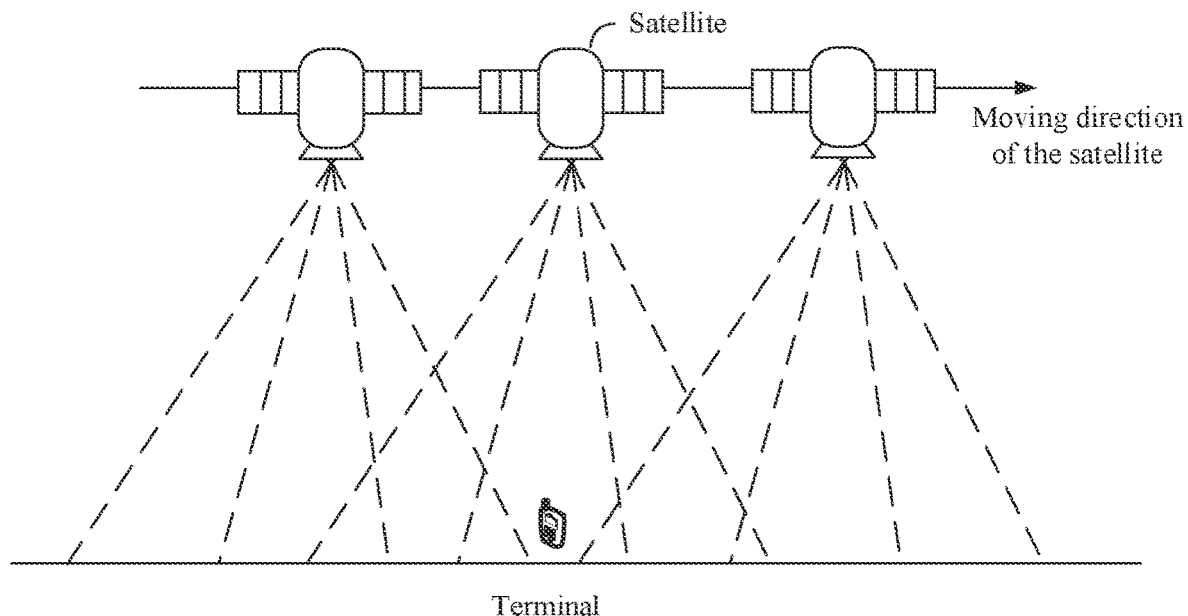
FIG. 2 is a schematic diagram of an architecture of an NTN communication system according to an embodiment of this application.

A beam transmitted by a satellite device in the attitude of being non-steerable towards ground moves along with the satellite, the satellite considers that an angle at which the satellite transmits each beam does not change over time, and a fixed point on ground experiences relatively frequent beam switching when the satellite moves overhead. Because a satellite running speed is faster than a speed of the earth's rotation, except for a synchronous satellite, a relationship between a satellite in a non-geostationary earth orbit and the earth can be approximated as follows: the earth is stationary and the satellite device performs periodic circular motion around the earth. As shown in FIG. 2, in the non-steerable attitude, an angle at which a satellite transmits a beam does not change. As a relative position of the satellite to ground changes, a ground area covered by the beam changes. If a terminal is in a state of being stationary relative to the earth, a beam covering the terminal also changes. As the satellite moves, the beam covering the terminal also changes, and the terminal needs to perform beam switching.

Figure 3:
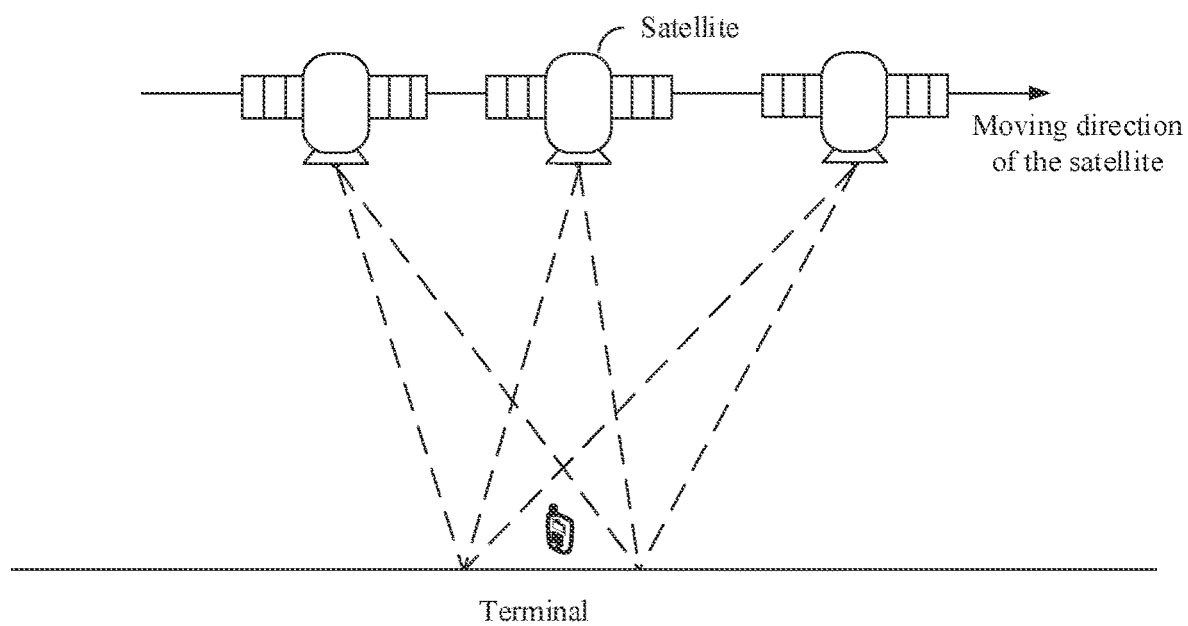
FIG. 3 is a schematic diagram of an architecture of an NTN communication system according to an embodiment of this application.

In a steerable satellite system, an angle at which a satellite transmits each beam is adjusted in a specific manner, to continuously observe a fixed point on ground. For example, as shown in FIG. 3, in a running process of a satellite, a same area is continuously observed by adjusting a transmit angle of a beam (that is, a same beam is formed to continuously cover a same area). In the steerable attitude, if a terminal moves out of a satellite steerable area (that is, the area continuously covered by the beam), beam switching also occurs.

It should be understood that different beams may be distinguished in a protocol based on a bandwidth part (BWP), a transmission configuration indicator (TCI), or a synchronization signal block (SSB), or in other words, a beam may be indicated based on a BWP, a TCI, or an SSB. Therefore, beam switching may be indicated between the terminal and the network device by switching of the BWP, the TCI, or the SSB. In this way, for the terminal and/or the network device, switching actually performed may be switching of the BWP, the TCI, or the SSB.

In addition, the beam in this application may be replaced with the BWP, the TCI, or the SSB. Therefore, reliability of an uplink of the terminal may also be improved in a BWP switching, TCI switching, or SSB switching scenario according to the method provided in this application. For example, in this application, a serving beam used by the terminal to currently access a network device may be replaced with a serving BWP, a serving TCI, or a serving SSB. Correspondingly, a target beam to which the terminal is switched from the serving beam may be replaced with a target BWP, a target TCI, or a target SSB.

The ground station may be configured to connect the satellite to a core network. When the satellite serves as a base station for wireless communication, the ground station may transparently transmit signaling between the satellite and the core network. Alternatively, the ground station may serve as a base station for wireless communication, and the satellite may transparently transmit signaling between the terminal and the ground station. For example, when communication is performed, the ground station may send signaling from the core network to the satellite over a feeder link, and the satellite sends the signaling to the terminal over a service link between the satellite and the terminal. Alternatively, the terminal may transmit signaling to the satellite over the service link, and the satellite sends the signaling to the core network through the ground station.

It should be understood that FIG. 1 shows only one satellite and one ground station. In actual use, an architecture with a plurality of satellites and/or a plurality of ground stations may be used as required. Each satellite may provide a service to one or more terminals, each satellite may correspond to one or more ground stations, and each ground station may correspond to one or more satellites. This is not specifically limited in this application.

Based on the NTN communication system shown in FIG. 1, the terminal may apply for access to a network in a contention-based random access manner. The first step of random access is that the terminal sends a random access preamble for applying for access. For NTN communication, the terminal may perform timing advance adjustment when sending the preamble, to reduce impact of a round trip delay on receiving the random access preamble. A delay that needs to be compensated is related to a distance between the terminal and the satellite base station, and a TA used to compensate the delay is referred to as a full timing advance (full TA). Currently, to reduce signaling overheads and complexity of signal processing on a terminal side, the satellite base station may be responsible for compensating a part of delay, and the terminal needs to compensate for only a part of delay that the terminal is responsible for. The part of delay that the terminal is responsible for compensating is compensated by using a differential TA of the terminal. A delay compensated by a network side is compensated by using a network side delay compensation amount (a compensated TA).

For a beam switching scenario, in this application, a beam before switching may be referred to as a serving beam, and a beam after switching may be referred to as a target beam. In addition, a satellite transmitting the serving beam may be referred to as a serving satellite (or in other words, the serving satellite is a satellite to which the serving beam belongs), and a satellite transmitting the target beam may be referred to as a target satellite (or in other words, the target satellite is a satellite to which the target beam belongs). For example, in FIG. 1, the terminal is currently located within a coverage area of a beam #2, and when the terminal is located at a boundary location between the beam #2 and a beam #3 (or a beam #1), beam switching occurs. The beam #2 is a serving beam of the terminal, and the beam #3 (or the beam #1) after switching is a target beam.

When beam switching occurs, the terminal is located at a boundary between the two beams. It may be considered that a distance between the terminal and the satellite remains unchanged before and after beam switching. Therefore, the terminal has a same full timing advance before and after beam switching. However, for the serving beam before switching and the target beam after switching, delays that the network side is responsible for compensating are different. Therefore, for the serving beam and the target beam, delays that the terminal is responsible for compensating are also different. In other words, the terminal has different differential TAs for the serving beam and the target beam.

Because the differential TA on the target beam cannot be accurately learned, the terminal cannot initiate random access by using an uplink beam after switching, resulting in that communication between the terminal and the satellite is interrupted. To improve communication continuity of an uplink, this application provides a communication method. The communication method may be applied to the NTN communication system shown in FIG. 1. Specifically, the communication method may be implemented by a terminal and a network device. The network device may be a base station that provides wireless network access for the terminal. For example, the network device may be the satellite or the ground station in FIG. 1 that serves as a wireless communication base station.

Figure 4:
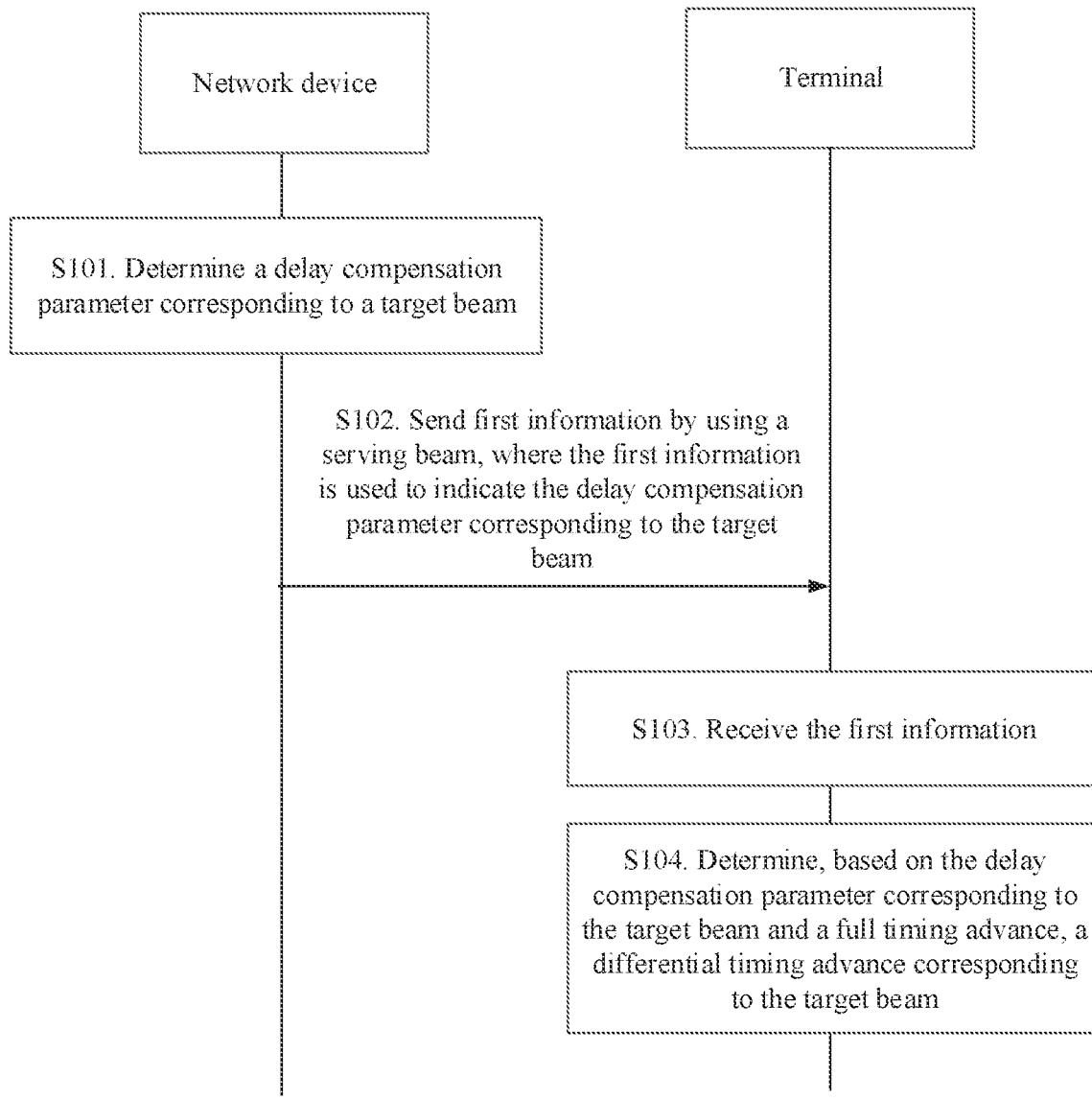
FIG. 4 is a schematic flowchart of a communication method according to an embodiment of this application.

As shown in the FIG. 4, the communication method may include the following steps.

S101. The network device determines first information.

The first information may be used to indicate a delay compensation parameter corresponding to a target beam, and the delay compensation parameter corresponding to the target beam is used to determine a differential timing advance corresponding to the target beam.

It should be understood that the network device is a network device corresponding to a serving beam.

S102. The network device sends the first information to the terminal by using the serving beam. The serving beam and the target beam are different beams.

S103. The terminal receives the first information by using the serving beam.

S104. The terminal determines, based on the delay compensation parameter corresponding to the target beam and a full timing advance, the differential timing advance corresponding to the target beam.

With the foregoing method, the terminal may obtain, from the currently accessed network device, the delay compensation parameter corresponding to the target beam that is about to be accessed, so that the terminal may determine, based on the full timing advance and the delay compensation parameter corresponding to the target beam, the differential timing advance corresponding to the target beam, to perform delay compensation and initiate uplink random access on the target beam. Therefore, continuity of an uplink can be maintained, to improve communication reliability of the uplink.

In this application, the delay compensation parameter corresponding to the target beam may be represented by using delay_compensated_targ. The full timing advance may be calculated by using a distance between the UE and the satellite, and may be represented as TA_full. The differential timing advance corresponding to the target beam may be represented as UE_speci_diff_TA_targ. Subsequently, the terminal may perform timing advance adjustment by using the timing advance, to perform uplink access or send uplink data.

In an implementation of S104, a relationship between the differential timing advance corresponding to the target beam, the delay compensation parameter corresponding to the target beam, and the full timing advance may satisfy the following formula:

$$UE\_speci\_diff\_TA\_targ = TA\_full - delay\_compensated\_targ \quad \text{(Formula 1)}.$$

In addition, this application does not limit proper transformation performed on the formula when the correspondence between the three is expressed, for example, a proportion coefficient and an offset are added to the formula.

In the foregoing example, the delay compensation parameter corresponding to the target beam may include a delay compensation value of a service link of the target beam and/or a delay compensation value of a feeder link of the target beam. The delay compensation value of the service link of the target beam is a delay compensation value used by a network device of the target beam to perform delay compensation on the service link of the target beam. The delay compensation value of the feeder link of the target beam is a delay compensation value used by the network device of the target beam to perform delay compensation on the feeder link of the target beam.

The delay compensation value of the service link of the target beam and/or the delay compensation value of the feeder link of the target beam may be determined by the network device of the target beam. For example, the network device of the target beam may determine the delay compensation value of the service link of the target beam and/or the delay compensation value of the feeder link of the target beam based on a signal round trip delay between the network device and a selected reference point. It should be understood that, in a beam switching scenario in which a satellite is not changed, the serving beam and the target beam belong to the same satellite. Therefore, the network device of the target beam is the same as the network device of the serving beam. In a scenario in which beam switching is caused by satellite switching, the network device of the target beam is different from the network device of the serving beam. In this case, the network device of the serving beam may obtain, from the network device of the target beam, the delay compensation parameter corresponding to the target beam.

In a possible implementation, the terminal may determine, by using the received delay compensation parameter of the target beam, an adjustment value corresponding to the delay compensation parameter of the target beam. The adjustment value may indicate a duration of delay compensation performed by a network side on uplink data.

For example, the terminal may determine, based on the following formula, the adjustment value corresponding to the delay compensation parameter of the target beam:

$$N_{DC} = delay\_compensated\_targ * 16 * 64 / 2^u * Tc \quad \text{(Formula 2)}.$$

delay_compensated_targ represents the delay compensation parameter corresponding to the target beam, and a value is a non-negative integer $N_{DC}$ indicates a value of delay compensation performed on the serving beam on an uplink signal, u corresponds to a data subcarrier spacing. The data subcarrier spacing is $15*2^u$ kilohertz (kHz). Tc represents a time unit and may be defined as $Tc=0.509*10^{-6}$ ms.

Similarly, an adjustment value corresponding to the differential timing advance used by the terminal on the target beam may be represented as UE_speci_diff_TA- _targ*16*64/2^$u$*Tc. The adjustment value corresponding to the differential timing advance may indicate a timing advance adjustment value used when the terminal sends uplink data, that is, a duration of delay compensation performed on uplink data on a terminal side. In other words, the terminal compensates, by using the adjustment value, a delay in sending an uplink signal to the network device. For example, if an uplink signal needs to be sent to the network device at a specific time, the terminal may send the uplink signal in a period of time before the specific time. The period of time is a differential timing advance adjustment value used when the terminal sends uplink data.

In a possible implementation of this application, the first information may include the delay compensation parameter corresponding to the target beam. For example, the network device sends, to the terminal, the delay compensation parameter corresponding to the target beam as the first information. Alternatively, there may be a specific association relationship between the first information and the delay compensation parameter corresponding to the target beam, and both the terminal and the network device have learned the association relationship, so that the delay compensation parameter corresponding to the target beam is indicated by using the first information. The association relationship is, for example, a scaling relationship, a function relationship, or a one-to-one correspondence relationship.

In another implementation, the first information may include information used to determine the delay compensation parameter corresponding to the target beam, for example, location information of a reference point of the target beam and/or location information of a satellite (that is, a target satellite) to which the target beam belongs (or ephemeris information of the satellite, used to determine the location information of the satellite). The location information of the reference point may be used to determine the delay compensation value of the service link of the target beam and/or the delay compensation value of the feeder link of the target beam. The reference point may include a reference point of the service link of the target beam and/or a reference point of the feeder link of the target beam.

Specifically, the terminal may determine, based on the location information of the reference point and the location information of the satellite, the delay compensation parameter corresponding to the target beam. For example, the delay compensation value of the service link of the target beam may be determined based on the location information of the reference point of the service link of the target beam and the location information of the satellite; and/or the delay compensation value of the feeder link of the target beam may be determined based on the location information of the reference point of the feeder link of the target beam and the location information of the satellite. A specific calculation manner is obtaining the delay compensation value of the service link of the target beam based on a round trip delay between a location of the satellite of the target beam and a location of the reference point of the service link of the target beam. Similarly, the delay compensation value of the feeder link of the target beam may be obtained.

Then, the terminal may determine, based on the full timing advance and the delay compensation parameter corresponding to the target beam, the differential timing advance corresponding to the target beam.

In this application, there may be a plurality of methods for determining the full timing advance by the terminal. The following describes several possible implementations by using examples.

Manner 1: The terminal may determine the full timing advance based on location information of the terminal and the location information of the satellite to which the target beam belongs. The full timing advance is a full timing advance of the service link of the target beam.

The terminal may obtain the location information of the terminal by using a positioning function of the terminal.

In addition, in a beam switching scenario in which a satellite is not changed, the satellite to which the target beam belongs is a satellite to which the serving beam belongs, and the location information of the satellite is known information for the terminal. Therefore, the terminal may determine the full timing advance based on the location information of the terminal and the location information of the satellite.

In a scenario in which beam switching is caused by satellite switching, the terminal may obtain, from the network device to which the serving beam belongs, the location information of the satellite to which the target beam belongs. Specifically, the network device to which the serving beam belongs may determine the satellite to which the target beam that the terminal is about to be switched to belongs, and the network device sends the location information of the satellite to the terminal. Then, the terminal may determine the full timing advance based on the location information of the terminal and the location information of the satellite to which the target beam belongs.

In a specific implementation, the terminal having a positioning function may determine the location information of the terminal based on the positioning function, determine the full timing advance of the service link of the target beam based on the location information of the terminal and the location information of the satellite to which the target beam belongs, determine, based on the full timing advance of the service link of the target beam and the delay compensation value of the service link of the target beam, the differential timing advance corresponding to the target beam.

Alternatively, the terminal having a positioning function may determine the location information of the terminal based on the positioning function, determine a full timing advance of the feeder link and the service link of the target beam based on the location information of the reference point of the feeder link of the target beam and the satellite to which the target beam belongs, and determine, based on the full timing advance of the target beam and the delay compensation values of the feeder link and the service link of the target beam, the differential timing advance corresponding to the target beam.

Manner 2: The terminal may determine the full timing advance based on a delay compensation parameter on the serving beam and a differential timing advance on the serving beam.

The delay compensation parameter on the serving beam may be broadcast, multicast, or separately sent by the satellite of the serving beam to the terminal by using the serving beam. Therefore, the terminal may obtain the delay compensation parameter by using the serving beam. The differential timing advance on the serving beam is used by the terminal to perform delay compensation on the serving beam, and therefore, may be considered as known for the terminal.

For example, a relationship between the delay compensation parameter on the serving beam, the differential timing advance on the serving beam, and the full timing advance may satisfy the following formula:

$$TA\_full = delay\_compensated\_serv + UE\_speci\_diff\_TA\_serv \quad \text{(Formula 3)}.$$

TA_full represents the full timing advance, delay_compensated_serv represents the delay compensation parameter on the serving beam, and UE_speci_diff_TA_serv represents the differential timing advance on the serving beam.

In this example, the differential timing advance corresponding to the target beam may be represented by using the following formula:

$$\text{UE\_speci\_diff\_TA\_targ} = \text{delay\_compensated\_serv} + \text{UE\_speci\_diff\_TA\_serv} - \text{delay\_compensated\_targ} \quad \text{(Formula 4)}.$$

UE_speci_diff_TA_targ represents the differential timing advance used by the terminal on the target beam (or referred to as the differential timing advance corresponding to the target beam), and delay_compensated_targ represents the delay compensation parameter used by the network device on the target beam.

It should be understood that, in Manner 2, the terminal may not have a positioning function.

For example, the terminal that does not have a positioning function may obtain the full timing advance of the serving beam based on the delay compensation value and the differential timing advance of the serving beam, and then determine, based on the delay compensation value of the service link of the target beam and the delay compensation value of the feeder link of the target beam, the differential timing advance corresponding to the target beam.

In an implementation of this application, the first information may be carried in at least one of broadcast information such as a system information block (SIB) 1, other system information (OSI), and a master information block (MIB), and sent by the network device to the terminal through unicast, broadcast, or multicast. In addition, if sending is performed in a radio resource control (RRC) connection phase, the network device may add fourth information to at least one of information such as RRC information, downlink control information (DCI), group DCI, a media access control (MAC) element, or a timing advance command (TAC), or the first information is sent to the terminal along with data transmission or in a PDSCH bearer separately allocated.

For example, the first information may be carried in initial bandwidth part (BWP) signaling and/or non-initial BWP signaling sent by the network device to the terminal. The non-initial BWP signaling is, for example, any one or more of BWP downlink common (BWP-DownlinkCommon) signaling, BWP uplink common (BWP-UplinkCommon) signaling, BWP downlink dedicated (BWP-DownlinkDedicated) signaling, or BWP uplink dedicated (BWP-UplinkDedicated) signaling.

The following describes, by using examples, a manner of carrying the first information.

When the first information is carried in the initial BWP signaling, for example, a format of the initial BWP signaling is as follows:

```
BWP ::=                     SEQUENCE{
    locationAndBandwidth        INTEGER (0..37949),
    subcarrierSpacing           SubcarrierSpacing,
    cyclicPrefix                ENUMERATE { extended }
OPTIONAL
    DelayCompensatedTargeted
DelayCompensatedTargetedList
}
```

The "DelayCompensatedTargeted" field may be used to carry the first information. "DelavCompensatedTargetedList" indicates a specific value of the first information.

When the first information is carried in the BWP downlink common signaling, for example, a format of the BWP downlink common signaling is as follows:

```
BWP-DownlinkCommon ::=      SEQUENCE {
    genericParameters           BWP,
    pdcch-ConfigCommon          SetupRelease { PDCCH-
ConfigCommon }
    pdsch-Config,Common         SetupRelease { PDSCH-
ConfigCommon }
    DelayCompensatedTargeted
DelayCompensatedTargetedList
    ...
}
```

The "DelayCompensatedTargeted" field may be used to carry the first information. "DelayCompensatedTargetedList" indicates a specific value of the first information.

When the first information is carried in the BWP uplink common signaling, for example, a format of the BWP uplink common signaling is as follows:

```
BWP-UplinkCommon ::=        SEQUENCE
    genericParameters           BWP,
    rach-ConfigCommon           SetupRelease { RACH-
ConfigCommon }
    pusch-ConfigCommon          SetupRelease
{ PUSCH-ConfigCommon }
    pucch-ConfigCommon          SetupRelease
{ PUCCH-ConfigCommon }
    DelayCompensatedTargeted    DelayCompensatedListTargeted
    ...
}
```

The DelayCompensatedTargeted field may be used to carry the first information. "DelayCompensatedTargetedList" indicates a specific value of the first information.

When the first information is carried in the BWP downlink dedicated signaling, for example, a format of the BWP downlink dedicated signaling is as follows:

```
BWP-DownlinkDedicated::=    SEQUENCE {
    pdcch-Config                SetupRelease { PDCCH-Config }
    pdsch-Config                SetupRelease { PDSCH-Config }
    sps-Config                  SetupRelease { SPS-Config }
    radioLinkMonitoringConfig   SetupRelease
{ RadioLinkMonitoringConfig }
    DelayCompensatedTargeted    DelayCompensatedTargetedList
    ...
}
```

The "DelayCompensatedTargeted" field may be used to carry the first information. "DelayCompensatedTargetedList" indicates a specific value of the first information.

When the first information is carried in the BWP uplink dedicated signaling, for example, a format of the BWP uplink dedicated signaling is as follows:

```
BWP-UplinkDedicated ::=     SEQUENCE {
    pucch-Config                SetupRelease
{ PUCCH-Config }
    pusch-Config                Setup-Release { PUSCH-
Config }
    configuredGrantConfig
SetupRelease { ConfiguredGrantConfig }
    srs-Config                  SetupRelease { SRS-Config }
    beamFailureRecoveryConfig
SetupRelease {
BeamFailureRecoveryConfig }
```

```
    DelayCompensatedTargeted         DelayCompensatedTargetedList
        ...
}
```

The "DelayCompensatedTargeted" field may be used to carry the first information. "DelayCompensatedTargetedList" indicates a specific value of the first information.

In addition, when the serving beam and the target beam belong to different cells, the first information may alternatively be carried in neighboring cell measurement configuration signaling and/or inter-cell handover signaling sent by the network device to the terminal. The latter is, for example, a radio resource control (Radio Resource Control, RRC) reconfiguration (reconfiguration) message of the inter-cell handover signaling.

When the first information is carried in the neighboring cell measurement configuration signaling, for example, a format of the neighboring cell measurement configuration signaling is as follows:

```
MeasObjectNR ::= SEQUENCE {
    ssbFrequency                ARFCN-ValueNR OPTIONAL, --
    Cond SSBorAssociatedSSB
        DelayCompensatedTargeted
DelayCompensatedTargetedList
    }
    ssbSubcarrierSpacing        SubcarrierSpacing OPTIONAL, --
    Cond                        SSBorAssociatedSSB
    smtcl                       SSB-MTC OPTIONAL,
    -- Cond SSBorAssociatedSSB
    ... ...
}
```

When the first information is carried in the RRC reconfiguration message of the inter-cell handover signaling, for example, a format of the RRC reconfiguration message of the inter-cell handover signaling is as follows:

```
RRCReconfiguration-IEs ::=   SEQUENCE {
    radioBearerConfig           RadioBearerConfig   OPTIONAL,
                                                    --
Need M
    measConfig                  MeasConfig          OPTIONAL,
                                                    --
Need M
    ...
    }
    MeasObjectNR ::=            SEQUENCE {
        ssbFrequency            ARFCN-ValueNR       OPTIONAL,
                                                    --
Cond
    SSBorAssociatedSSB
        DelayCompensatedTargeted
DelayCompensatedTargetedList
    }
    ssbSubcarrierSpacing        SubcarrierSpacing   OPTIONAL,
                                                    --
Cond
    ...
    }
```

In the foregoing example, specific information included in the "DelayCompensatedTargetedList" field may be as follows:

```
DelayCompensatedTargetedList ::=    SEQUENCE {
    beamId                              BIT STRING (SIZE (n)),
    DelayCompensatedValue               BIT STRING (SIZE (n),
```

```
    ...
}
```

DelayCompensatedValue may indicate the first information. The first information is, for example, the delay compensation parameter of the target beam, the location information of the reference point of the service link on the target beam, and/or the location information of the satellite to which the target beam belongs, beamId represents an identification number (ID) of the target beam.

Figure 5:
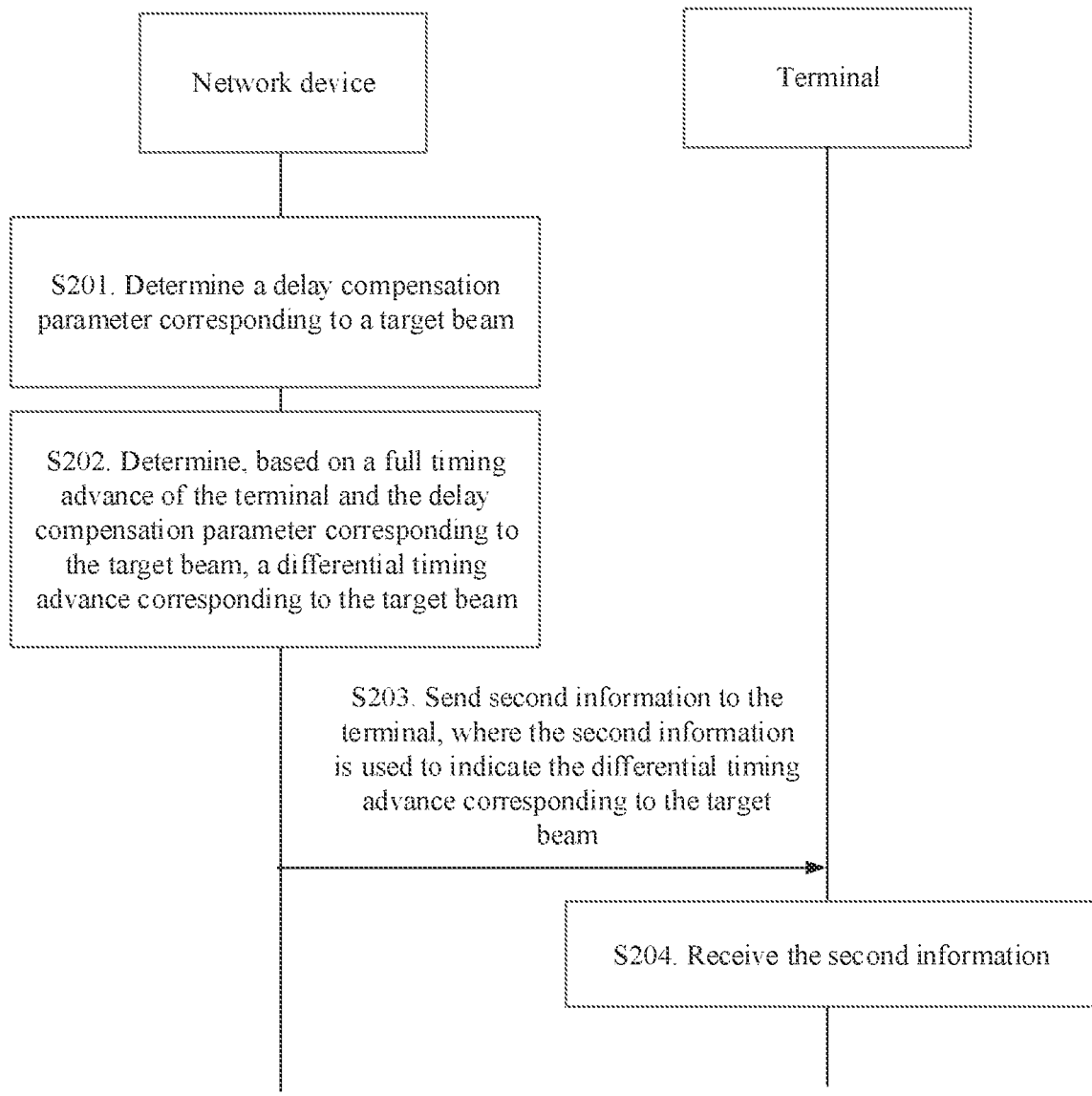
FIG. 5 is a schematic flowchart of a communication method according to an embodiment of this application.

An embodiment of this application provides another communication method, to improve continuity of NTN communication, and avoid communication interruption caused by beam switching. The following still uses the network device and the terminal as an example to describe the method. As shown in FIG. 5, the method may include the following steps:

S201. The network device determines a delay compensation parameter corresponding to a target beam.

S202. The network device determines, based on a full timing advance of the terminal and the delay compensation parameter corresponding to the target beam, a differential timing advance corresponding to the target beam.

S203. The network device sends second information to the terminal, where the second information is used to indicate the differential timing advance corresponding to the target beam.

S204. The terminal receives the second information.

With the foregoing method, a network device corresponding to a serving beam of the terminal may determine the delay compensation parameter corresponding to the target beam, and determine, based on the full timing advance of the terminal and the delay compensation parameter corresponding to the target beam, the differential timing advance corresponding to the target beam. In addition, the network device may indicate the differential timing advance corresponding to the target beam to the terminal, so that the terminal performs delay compensation and sends uplink data on the target beam, to maintain continuity of an uplink.

In this example, there are a plurality of manners for determining the full timing advance of the terminal by the network device. The following describes several feasible implementations by using examples.

Manner 1: The network device receives the full timing advance from the terminal.

In this manner, for a manner of determining the full timing advance of the terminal, refer to the method described in this application in which the terminal determines the full timing advance of the terminal.

Manner 2: The network device may receive terminal location information from the terminal, and determine the full timing advance based on the location information of the terminal and location information of a satellite to which the target beam belongs.

The terminal may obtain the location information of the terminal by using a positioning function of the terminal, and send the location information to the network device.

In addition, in a beam switching scenario in which a satellite is not changed, the satellite to which the target beam belongs is the same as a satellite to which the serving beam belongs, and the location information of the satellite may be considered as known to the network device. Therefore, the network device may determine the full timing advance of the terminal based on the terminal location information from the terminal and the location information of the satellite.

In a scenario in which beam switching is caused by satellite switching, the network device may obtain, from the satellite to which the target beam belongs, the location information of the satellite. Specifically, the network device to which the serving beam belongs may determine the satellite to which the target beam that the terminal is about to be switched to belongs, and obtains the location information of the satellite. Then, the network device may determine the full timing advance of the terminal based on the location information of the terminal and the location information of the satellite to which the target beam belongs.

Manner 3: The network device may determine the full timing advance of the terminal based on a delay compensation parameter on the serving beam and a differential timing advance on the serving beam.

The differential timing advance on the serving beam may be determined by the terminal, and sent by the terminal to the network device.

In addition, in a conventional technology, the delay compensation parameter on the serving beam is sent by the network device (or broadcast by the network device) to the terminal. Therefore, the delay compensation parameter on the serving beam is known to the network device.

For example, a relationship between the full timing advance of the terminal, the delay compensation parameter on the serving beam, and the differential timing advance on the serving beam may be shown in Formula 3.

For example, in S202, a relationship between the differential timing advance corresponding to the target beam, the delay compensation parameter corresponding to the target beam, and the full timing advance may be shown in Formula 1.

It should be understood that, in Manner 3, the terminal may not have a positioning function.

In an implementation of S203, signaling carrying the second information may include initial bandwidth part signaling and/or non-initial BWP signaling sent by the network device to the terminal. The non-initial BWP signaling is, for example, any one or more of BWP downlink common signaling, BWP uplink common signaling, BWP downlink dedicated signaling, or BWP uplink dedicated signaling.

In addition, when the serving beam and the target beam belong to different satellites, the second information may be carried in neighboring cell measurement configuration signaling and/or inter-cell handover signaling.

It should be understood that, for a manner of carrying the second information in the signaling, refer to the manner of carrying the first information in the signaling.

Figure 6:
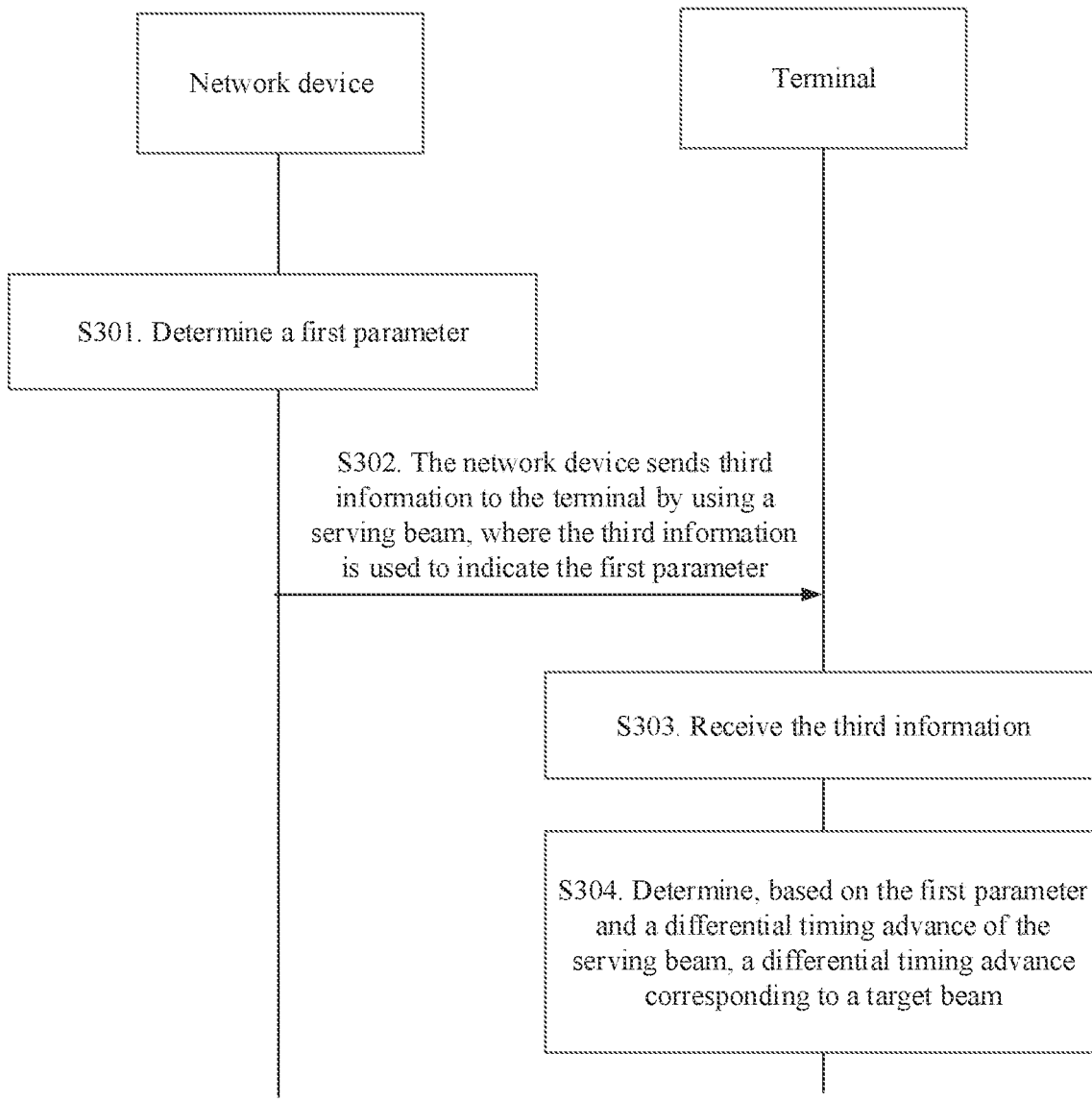
FIG. 6 is a schematic flowchart of a communication method according to an embodiment of this application.

An embodiment of this application provides another communication method, to improve continuity of NTN communication, and avoid communication interruption caused by beam switching. The following still uses the network device and the terminal as an example to describe the method. As shown in FIG. 6, the method may include the following steps.

S301. The network device determines a first parameter. The first parameter is used by the terminal to determine a differential timing advance corresponding to a target beam.

The first parameter includes a difference between a delay compensation parameter corresponding to a serving beam and a delay compensation parameter corresponding to the target beam. Alternatively, the first parameter includes the delay compensation parameter corresponding to the target beam and the delay compensation parameter corresponding to the serving beam.

S302. The network device sends third information to the terminal by using the serving beam, where the third information is used to indicate the first parameter, and the serving beam and the target beam are different beams.

S303. The terminal receives the third information.

S304. The terminal determines, based on the first parameter and a differential timing advance of the serving beam, the differential timing advance corresponding to the target beam.

With the foregoing method, the network device may indicate the first parameter to the terminal, and the terminal determines, based on the first parameter and the differential timing advance of the serving beam, the differential timing advance corresponding to the target beam, to perform delay compensation and send uplink data on the target beam, so as to maintain continuity of an uplink.

It should be understood that, for manners of determining the delay compensation parameter corresponding to the serving beam, the delay compensation parameter corresponding to the target beam, and the differential timing advance of the serving beam, refer to descriptions in this application. Descriptions are not repeated herein.

In a possible example, when the first parameter is the difference between the delay compensation parameter corresponding to the serving beam and the delay compensation parameter corresponding to the target beam, the first parameter may be represented by Δdelay_compensated, and Δdelay_compensated=delay_compensated_serv−delay_compensated_targ.

In this case, a relationship between the differential timing advance corresponding to the target beam, the first parameter, and the differential timing advance of the serving beam may be represented by using the following formula:

$$\text{UE\_speci\_diff\_TA\_targ} = \Delta\text{delay\_compensated} + \text{UE\_speci\_diff\_TA\_serv} \quad \text{(Formula 5)}.$$

UE_speci_diff_TA_targ represents the differential timing advance corresponding to the target beam, and UE_speci_diff_TA_serv represents the differential timing advance of the serving beam.

In another possible example, when the first parameter includes the delay compensation parameter corresponding to the serving beam and the delay compensation parameter corresponding to the target beam, the delay compensation parameter corresponding to the serving beam may be represented by delay_compensated_serv, and the delay compensation parameter corresponding to the target beam may be represented by delay_compensated_targ.

In this example, a relationship between the differential timing advance corresponding to the target beam, the delay compensation parameter corresponding to the serving beam, the delay compensation parameter corresponding to the target beam, and the differential timing advance of the serving beam may satisfy the following formula:

$$\text{UE\_speci\_diff\_TA\_targ} = (\text{delay\_compensated\_serv} - \text{delay\_compensated\_targ}) + \text{UE\_speci\_diff\_TA\_serv} \quad \text{(Formula 6)}.$$

For example, the third information may be carried in initial bandwidth part BWP signaling, BWP downlink common signaling, BWP uplink common signaling, BWP downlink dedicated signaling, BWP uplink dedicated signaling, neighboring cell measurement configuration signaling, and/or inter-cell handover signaling.

In addition, when the serving beam and the target beam belong to different satellites, the third information may be carried in neighboring cell measurement configuration signaling and/or inter-cell handover signaling.

It should be understood that, for a manner of carrying the third information in the signaling, refer to the manner of carrying the first information in the signaling.

In another possible example, when the serving beam and the target beam belong to a same satellite, the first parameter may include location information of a reference point of the serving beam, location information of a reference point of the target beam, and location information of the satellite (or ephemeris information of the satellite, used to determine the location information of the satellite).

The reference point of the serving beam may include a reference point of a service link of the serving beam and a reference point of a feeder link of the serving beam. The reference point of the target beam may include a reference point of a service link of the target beam and a reference point of a feeder link of the target beam. The terminal may determine, based on the location information of the reference point of the serving beam and the location information of the satellite, the delay compensation parameter corresponding to the serving beam. For example, the terminal may determine a delay compensation value of the service link of the serving beam based on the location information of the reference point of the service link of the serving beam and the location information of the satellite, where a possible determining manner is setting a round trip delay between the satellite and the reference point of the service link as the delay compensation value of the service link; and/or determine a delay compensation value of the feeder link of the serving beam based on the location information of the reference point of the feeder link of the serving beam and the location information of the satellite, where a possible determining manner is setting a round trip delay between the satellite and the reference point of the feeder link as the delay compensation value of the service link.

In addition, the terminal may determine, based on the location information of the reference point of the target beam and the location information of the satellite, the delay compensation parameter corresponding to the target beam. For a specific manner, refer to descriptions in this application.

After the delay compensation parameter corresponding to the serving beam and the delay compensation parameter corresponding to the target beam are determined based on the location information of the reference point of the serving beam, the location information of the reference point of the target beam, and the location information of the satellite, the differential timing advance of the target beam may be determined based on the delay compensation parameter corresponding to the serving beam, the delay compensation parameter corresponding to the target beam, and the differential timing advance of the serving beam. A relationship between the delay compensation parameter corresponding to the serving beam, the delay compensation parameter corresponding to the target beam, the differential timing advance of the serving beam, and the differential timing advance of the target beam may satisfy Formula 6.

It should be understood that, in this application, a reason for switching between the serving beam and the target beam is not limited to a change of a relative location of the terminal to the satellite, and may further include a reason such as switching of a ground station. For example, in a transparent mode of the satellite, when ground station switching occurs, a round trip delay between a ground station and the terminal changes, and a timing advance adjustment amount on a terminal side also changes.

Figure 7:
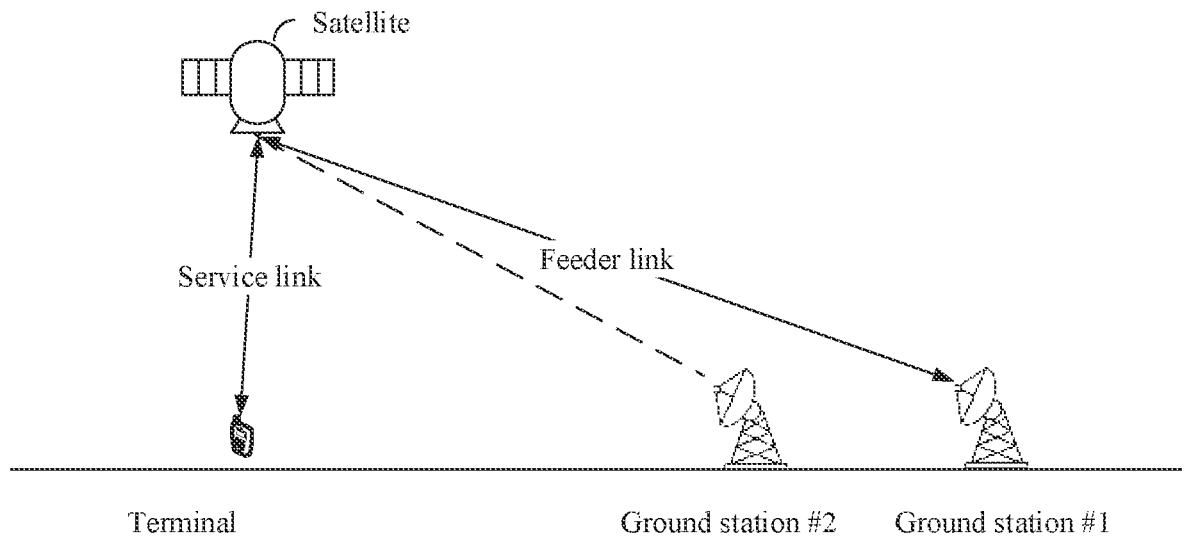
FIG. 7 is a schematic diagram of an architecture of an NTN communication system according to an embodiment of this application.

As shown in FIG. 7, when a ground station accessed by the satellite is switched from a ground station #1 to a ground station #2, a round trip delay between the ground station and the terminal changes, and the terminal needs to re-determine a timing advance used by the terminal.

FIG. 7 is used as an example. In a possible example, before the ground station #1 accessed by the satellite is switched to the ground station #2, the ground station #1 may send a second parameter to the terminal by using the satellite, and the terminal determines, based on the second parameter, a timing advance adjustment amount used after switching to the ground station #2. The second parameter may include the timing advance adjustment amount used by the terminal after switching to the ground station #2. Alternatively, the second parameter may include a difference between the timing advance adjustment amount used by the terminal after switching to the ground station #2 and a timing advance adjustment amount used by the terminal before switching to the ground station #2 (that is, a timing advance adjustment amount currently used by the terminal), and the terminal may determine, based on the difference and the timing advance adjustment amount used by the terminal before switching from the ground station #1 to the ground station #2, the timing advance adjustment amount used after switching to the ground station.

In addition, the ground station #1 may indicate, to the terminal by using the satellite, when to use the new timing advance adjustment amount to send uplink data.

In this example, the ground station #1 may send fourth information to the terminal. The fourth information may be carried in at least one type of information in broadcast information such as a SIB1, OSI, or a MIB, and is sent by the network device to the terminal through unicast, broadcast, or multicast. In addition, if sending is performed in an RRC connection phase, the network device may alternatively add the fourth information to at least one type of information in RRC information. DCI, group DCI, a MAC element, or a TAC, or the fourth information is sent to the terminal along with data transmission or in a PDSCH bearer separately allocated.

For example, the network device may add the fourth information to initial bandwidth part signaling and/or non-initial BWP signaling. The fourth information may be used to indicate the second parameter, or an association relationship such as a correspondence or a function relationship exists between the fourth information and the second parameter. In addition, the fourth information may further include time information, so that the terminal determines when to use the new timing advance adjustment amount to perform uplink sending.

FIG. 7 is still used as an example. In another possible example, before the ground station #1 accessed by the satellite is switched to the ground station #2, the satellite may broadcast or separately send location information of the ground station #2 to the terminal. The terminal may determine a round trip delay of a feeder link between the satellite and the ground station #2 by using location information (which may be obtained based on ephemeris information) of the satellite and the location information of the ground station #2. Moreover, the terminal may determine a difference between a round trip delay between the satellite and the ground station #1 and the round trip delay between the satellite and the ground station #2 (referred to as a round trip delay difference below). Then, the terminal may obtain, based on a timing advance adjustment amount currently used by the terminal and the round trip delay difference, a timing advance adjustment amount that should be used after the ground station is switched. Location information of the ground station #1 may be sent by the satellite to the terminal in a broadcast or separately sent manner, so that the terminal determines the round trip delay difference between the ground station #1 and the ground station #2.

Based on the foregoing method embodiments, when the terminal needs to perform intra-satellite beam switching (that is, the serving beam and the target beam belong to a same satellite), the terminal may determine, in any one or more of the following manners 1 to 9, the differential timing advance corresponding to the target beam.

Manner 1

If the terminal has a positioning function, before beam switching, the network device may send the delay compensation value of the service link of the target beam to the terminal.

The terminal may determine the location information of the terminal by using the positioning function, and determine the full timing advance of the service link of the target beam based on the location information of the terminal and the location information of the satellite. The full timing advance may be determined based on the round trip delay between the terminal and the satellite. Then, due to intra-satellite beam switching, the serving beam and the target beam have the same full timing advance of the service link. The terminal may determine, based on the full timing advance of the service link and the delay compensation value of the service link of the target beam, the differential timing advance corresponding to the target beam.

For example, a relationship between the differential timing advance corresponding to the target beam, the full timing advance of the service link of the target beam, and the delay compensation value of the service link of the target beam satisfies Formula 1 or another formula obtained through transformation based on Formula 1.

In Formula 1, UE_speci_diff_TA_targ represents the differential timing advance corresponding to the target beam, TA_full may represent the full timing advance of the service link of the target beam, and delay_compensated_targ may represent the delay compensation value of the service link of the target beam.

Manner 2

If the terminal has a positioning function, before beam switching, the network device may send the location information of the reference point of the service link of the target beam to the terminal.

The terminal may determine the delay compensation value of the service link of the target beam based on the location information of the reference point of the service link of the target beam and the location information of the satellite. The terminal may further determine the location information of the terminal by using the positioning function of the terminal, and determine the full timing advance of the service link of the target beam based on the location information of the terminal and the location information of the satellite. Then, the terminal may determine, based on the full timing advance of the service link of the target beam and the delay compensation value of the service link of the target beam, the differential timing advance corresponding to the target beam.

For example, a relationship between the differential timing advance corresponding to the target beam, the full timing advance of the service link of the target beam, and the delay compensation value of the service link of the target beam satisfies Formula 1 or another formula obtained through transformation based on Formula 1.

In Formula 1, UE_speci_diff_TA_targ represents the differential timing advance corresponding to the target beam, TA_full may represent the full timing advance of the service link of the target beam, and delay_compensated_targ may represent the delay compensation value of the service link of the target beam.

Manner 3

If the terminal does not have a positioning function, before beam switching, the network device may send the delay compensation parameter corresponding to the target beam to the terminal. The delay compensation parameter of the target beam may include the delay compensation value of the service link of the target beam and/or the delay compensation value of the feeder link of the target beam. In addition, the terminal may further receive, from the network device, the delay compensation parameter corresponding to the serving beam.

The terminal may determine the full timing advance based on the delay compensation parameter corresponding to the serving beam and the currently used differential timing advance (that is, the differential timing advance corresponding to the serving beam). Then, the terminal may determine, based on the full timing advance and the delay compensation parameter corresponding to the target beam, the differential timing advance corresponding to the target beam.

For example, Formula 4 or another formula obtained through transformation based on Formula 4 may be satisfied between the differential timing advance corresponding to the target beam, the full timing advance, and the delay compensation parameter corresponding to the target beam.

Manner 4

If the terminal does not have a positioning function, before beam switching, the network device may send the location information of the reference point of the target beam to the terminal. The reference point of the target beam may include the reference point of the service link of the target beam and/or the reference point of the feeder link of the target beam. In addition, the terminal may further receive, from the network device, the delay compensation parameter corresponding to the serving beam.

The terminal may determine the delay compensation parameter of the target beam based on the location information of the reference point of the target beam and the location information of the satellite. The delay compensation parameter of the target beam may include the delay compensation value of the service link of the target beam and/or the delay compensation value of the feeder link of the target beam.

In addition, the terminal may determine the full timing advance based on the delay compensation parameter corresponding to the serving beam and the currently used differential timing advance. The terminal may further determine, based on the full timing advance and the delay compensation parameter corresponding to the target beam, the differential timing advance corresponding to the target beam.

For example, Formula 4 or another formula obtained through transformation based on Formula 4 may be satisfied between the differential timing advance corresponding to the target beam, the full timing advance, and the delay compensation parameter corresponding to the target beam.

Manner 5

If the terminal has a positioning function, before beam switching, the terminal may send the location information of the terminal to the network device. The network device may determine the full timing advance of the terminal based on the location information of the terminal and the location information of the satellite. Then, the network device may determine the differential timing advance of the target beam based on the delay compensation parameter of the target beam and the full timing advance, and send the differential timing advance of the target beam to the terminal. The delay compensation parameter of the target beam may include the delay compensation value of the service link of the target beam and/or the delay compensation value of the feeder link of the target beam.

For example, Formula 1 or another formula obtained through transformation based on Formula 1 may be satisfied between the differential timing advance of the target beam, the delay compensation parameter of the target beam, and the full timing advance.

Manner 6

If the terminal does not have a positioning function, before beam switching, the terminal may send, to the network device, the differential timing advance currently used by the terminal. The network device may determine the full timing advance of the terminal based on the differential timing advance from the terminal and the delay compensation parameter of the serving beam. Then, the network device may determine the differential timing advance of the target beam based on the delay compensation parameter of the target beam and the full timing advance, and send the differential timing advance of the target beam to the terminal. The delay compensation parameter of the target beam may include the delay compensation value of the service link of the target beam and/or the delay compensation value of the feeder link of the target beam.

For example, Formula 1 or another formula obtained through transformation based on Formula 1 may be satisfied between the differential timing advance of the target beam, the delay compensation parameter of the target beam, and the full timing advance.

Manner 7

If the terminal does not have a positioning function, before beam switching, the network device may send, to the terminal, the difference between the delay compensation parameter corresponding to the target beam and the delay compensation parameter corresponding to the serving beam.

The terminal may determine the differential timing advance of the target beam based on the differential timing advance currently used by the terminal (that is, the differential timing advance of the serving beam) and the difference from the network device. Formula 5 or another formula obtained through transformation based on Formula 5 may be satisfied between the differential timing advance currently used by the terminal, the difference, and the differential timing advance of the target beam.

Manner 8

If the terminal does not have a positioning function, before beam switching, the network device may send the delay compensation parameter corresponding to the target beam to the terminal. In addition, the terminal may further obtain, from the network device, the delay compensation parameter corresponding to the serving beam.

The terminal may determine the differential timing advance of the target beam based on the differential timing advance currently used by the terminal (that is, the differential timing advance of the serving beam), the delay compensation parameter corresponding to the target beam, and the delay compensation parameter corresponding to the serving beam.

For example, Formula 6 or another formula obtained through transformation based on Formula 6 may be satisfied between the differential timing advance of the target beam, the differential timing advance currently used by the terminal, the delay compensation parameter corresponding to the target beam, and the delay compensation parameter corresponding to the serving beam.

Manner 9

If the terminal does not have a positioning function, before beam switching, the network device may send the location information of the reference point of the target beam and the location information of the reference point of the serving beam to the terminal. The reference point of the target beam may include the reference point of the service link of the target beam and/or the reference point of the feeder link of the target beam. The reference point of the serving beam may include the reference point of the service link of the serving beam and/or the reference point of the feeder link of the serving beam.

The terminal may determine the delay compensation parameter of the target beam based on the location information of the reference point of the target beam and the location information of the satellite. The delay compensation parameter of the target beam may include the delay compensation value of the service link of the target beam and/or the delay compensation value of the feeder link of the target beam. Moreover, the terminal may determine the delay compensation parameter of the serving beam based on the location information of the reference point of the serving beam and the location information of the satellite. The delay compensation parameter of the serving beam may include the delay compensation value of the service link of the serving beam and/or the delay compensation value of the feeder link of the serving beam.

Then, the terminal may determine the differential timing advance of the target beam based on the differential timing advance currently used by the terminal (that is, the differential timing advance of the serving beam), the delay compensation parameter corresponding to the target beam, and the delay compensation parameter corresponding to the serving beam.

For example, Formula 6 or another formula obtained through transformation based on Formula 6 may be satisfied between the differential timing advance of the target beam, the differential timing advance currently used by the terminal, the delay compensation parameter corresponding to the target beam, and the delay compensation parameter corresponding to the serving beam.

In addition, when the terminal needs to perform inter-satellite beam switching (that is, the serving beam and the target beam belong to different satellites), the terminal may determine, in any one or more of the following manners 10 to 12, the differential timing advance corresponding to the target beam.

Manner 10

If the terminal has a positioning function, before beam switching, the network device may send, to the terminal, the delay compensation value of the service link of the target beam, and the location information of the satellite to which the target beam belongs (or the ephemeris information of the satellite to which the target beam belongs, where the location information of the satellite to which the target beam belongs may be determined based on the ephemeris information).

The terminal may determine the location information of the terminal by using the positioning function, and determine the full timing advance of the service link of the target beam based on the location information of the terminal and the location information of the satellite to which the target beam belongs. Then, the terminal may determine, based on the full timing advance of the service link of the target beam and the delay compensation value of the service link of the target beam, the differential timing advance corresponding to the target beam.

For example, a relationship between the differential timing advance corresponding to the target beam, the full timing advance of the service link of the target beam, and the delay compensation value of the service link of the target beam satisfies Formula 1 or another formula obtained through transformation based on Formula 1.

In Formula 1, UE_speci_diff_TA_targ represents the differential timing advance corresponding to the target beam, TA_full may represent the full timing advance of the service link of the target beam, and delay_compensated_targ may represent the delay compensation value of the service link of the target beam.

Manner 11

If the terminal has a positioning function, before beam switching, the network device may send, to the terminal, the location information of the reference point of the service link of the target beam, and the location information of the satellite to which the target beam belongs (or the ephemeris information of the satellite to which the target beam belongs, where the location information of the satellite to which the target beam belongs may be determined based on the ephemeris information).

The terminal may determine the delay compensation value of the service link of the target beam based on the location information of the reference point of the service link of the target beam and the location information of the satellite to which the target beam belongs. The terminal may further determine the location information of the terminal by using the positioning function of the terminal, and determine the full timing advance of the service link of the target beam based on the location information of the terminal and the location information of the satellite. Then, the terminal may determine, based on the full timing advance of the service link of the target beam and the delay compensation value of the service link of the target beam, the differential timing advance corresponding to the target beam.

For example, a relationship between the differential timing advance corresponding to the target beam, the full timing advance of the service link of the target beam, and the delay compensation value of the service link of the target beam satisfies Formula 1 or another formula obtained through transformation based on Formula 1.

In Formula 1, UE_speci_diff_TA_targ represents the differential timing advance corresponding to the target beam, TA_full may represent the full timing advance of the service link of the target beam, and delay_compensated_targ may represent the delay compensation value of the service link of the target beam.

Manner 12

If the terminal has a positioning function, before beam switching, the terminal may send the location information of the terminal to the network device. The network device may determine the full timing advance of the terminal based on the location information of the terminal and the location information of the satellite to which the target beam belongs. Then, the network device may determine the differential timing advance of the target beam based on the delay compensation parameter of the target beam and the full timing advance, and send the differential timing advance of the target beam to the terminal. The delay compensation parameter of the target beam may include the delay compensation value of the service link of the target beam and/or the delay compensation value of the feeder link of the target beam.

For example, Formula 1 or another formula obtained through transformation based on Formula 1 may be satisfied between the differential timing advance of the target beam, the delay compensation parameter of the target beam, and the full timing advance.

It should be understood that, for the foregoing manner 1 to manner 9 of determining the differential timing advance corresponding to the target beam, the network device may use initial bandwidth part BWP signaling, non-initial BWP signaling, neighboring cell measurement configuration signaling, and/or inter-cell handover signaling when sending information to the terminal. For the foregoing manner 10 to manner 12 of determining the differential timing advance corresponding to the target beam, the network device may use neighboring cell measurement configuration signaling and/or inter-cell handover signaling when sending information to the terminal.

It should be understood that the embodiments described in this application may be independent solutions, or may be combined based on intrinsic logic. These solutions all fall within the protection scope of this application.

It may be understood that, in the foregoing method embodiments, the methods and the operations implemented by the terminal device may alternatively be implemented by a component (for example, a chip or a circuit) used in the terminal device, and the methods and the operations implemented by the network device may alternatively be implemented by a component (for example, a chip or a circuit) used in the network device.

In the foregoing embodiments provided in this application, the method provided in the embodiments of this application, that is, the procedure of the method, is described from a perspective of functions implemented by the terminal. To implement functions in the method provided in the foregoing embodiments of this application, the terminal may include a hardware structure and/or a software module, to implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint condition of the technical solutions.

Figure 8:
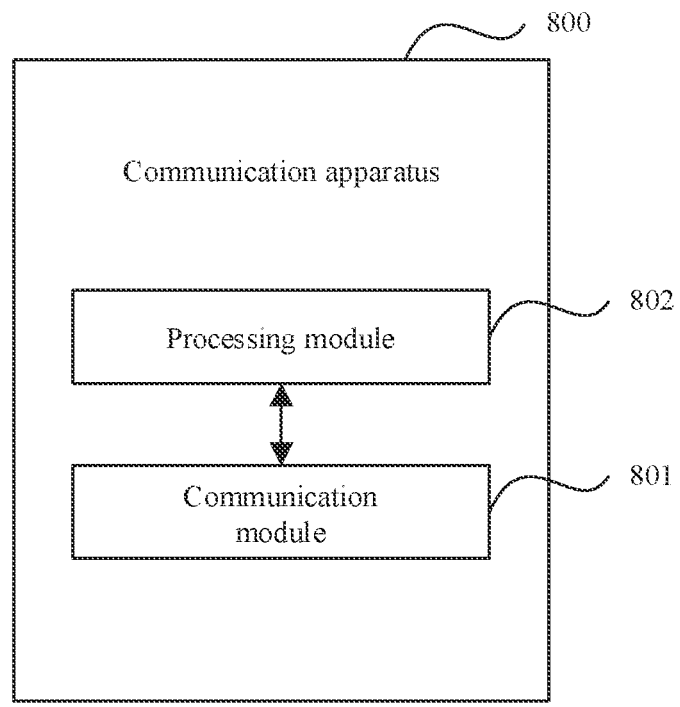
FIG. 8 is a schematic diagram of a structure of a communication apparatus according to an embodiment of this application.

As shown in FIG. 8, a communication apparatus provided in an embodiment of this application may include a communication module 801 and a processing module 802. The communication module 801 and the processing module 802 are coupled to each other. The communication apparatus 800 may be configured to perform steps performed by the terminal in the foregoing method embodiment. The communication module 801 may be configured to support the communication apparatus 800 in communication. The communication module 801 may have a wireless communication function, for example, can communicate with another communication apparatus in a wireless communication manner. The processing module 802 may be configured to support the communication apparatus 800 in performing a processing action of the terminal device in the foregoing method embodiment, including, but not limited to, generating information or a message to be sent by the communication module 801, and/or demodulating and decoding a signal received by the communication module 801, and the like.

When the steps performed by the terminal in the foregoing method embodiment are performed, the communication module 801 may be configured to perform a sending action and/or a receiving action of the terminal in the foregoing method embodiment, for example, configured to perform an action of sending information, a message, or signaling to a network device by the terminal, or configured to perform an action of receiving information, a message, or signaling from the network device; and/or the processing module 802 may be configured to perform a processing action of the terminal in the foregoing method embodiment, for example, configured to control the communication module 801 to receive and/or send information, a message, or signaling, store information, and perform other operations. Specifically, when an embodiment provided in this application is executed, the communication module 801 may be configured to receive first information by using a serving beam. The first information may be used to indicate a delay compensation parameter corresponding to a target beam, and the serving beam and the target beam are different beams. In addition, the processing module 802 may determine, based on the delay compensation parameter corresponding to the target beam and a full timing advance, a differential timing advance corresponding to the target beam.

For example, the first information comes from a network device corresponding to the serving beam.

For example, the serving beam is a beam used by the terminal to currently access the network device, and the target beam is a beam to which the terminal is about to be switched.

In a specific example, the processing module 802 may determine the full timing advance based on location information of the terminal and location information of a target satellite. The target satellite corresponds to the target beam, or in other words, the target satellite is a satellite that transmits the target beam. In this example, the communication module 801 may further receive the location information of the target satellite. For example, the communication module 801 may receive the location information of the target satellite from the network device.

In another example, the processing module 802 may determine the full timing advance based on a delay compensation parameter corresponding to the serving beam and a differential timing advance corresponding to the serving beam.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the communication module 801 may be configured to receive second information by using a serving beam. The second information may be used to indicate a differential timing advance corresponding to a target beam, and the target beam and the serving beam are different beams. Then, the processing module 802 may perform a timing advance based on the differential timing advance corresponding to the target beam.

For example, the second information may come from a network device corresponding to the serving beam.

In a possible example, the communication module 801 may be further configured to send location information of the terminal to the network device.

In another possible example, the communication module 801 may be further configured to send a differential timing advance of the serving beam to the network device.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the communication module 801 may be configured to receive third information by using a serving beam. The third information may be used to indicate a first parameter. In addition, the processing module 802 may determine, based on the first parameter and a differential timing advance of the serving beam, a differential timing advance corresponding to a target beam. The serving beam and the target beam are different beams. The first parameter may include a difference between a delay compensation parameter corresponding to the serving beam and a delay compensation parameter corresponding to the target beam. Alternatively, the first parameter may include the delay compensation parameter corresponding to the target beam and the delay compensation parameter corresponding to the serving beam.

For example, the third information comes from a network device corresponding to the serving beam.

The first information may be carried in one or more of signaling such as initial bandwidth part BWP signaling, non-initial BWP signaling, neighboring cell measurement configuration signaling, or inter-cell handover signaling.

Figure 9:
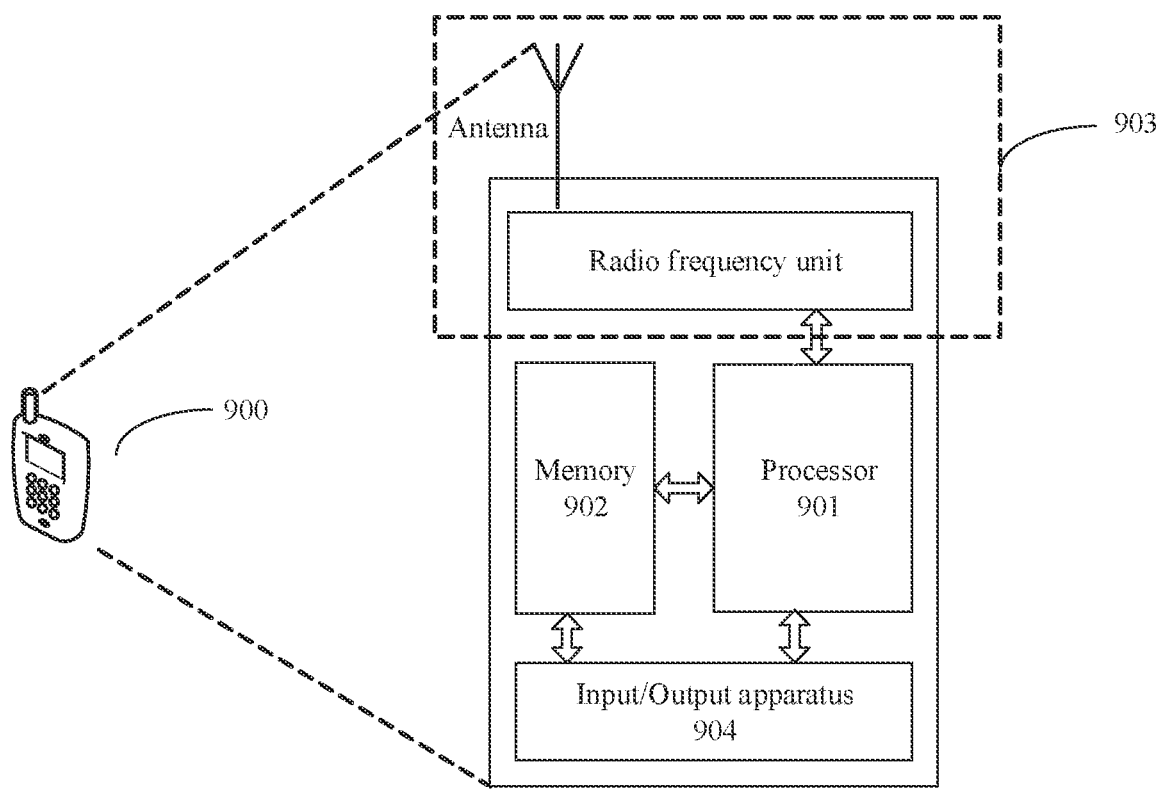
FIG. 9 is a schematic diagram of a structure of a communication apparatus according to an embodiment of this application.

When the terminal provided in this application is implemented, the communication apparatus may further include a hardware component. For ease of understanding and illustration, in FIG. 9, a mobile phone is used as an example to describe a structure of a communication apparatus 900 including a hardware component. As shown in FIG. 9, the communication apparatus 900 may include a processor 901, a memory 902, and a transceiver 903.

The processor 901 may be configured to process a communication protocol and communication data, control the communication apparatus 900, execute a program, process data of the program, and the like. The memory 902 may be configured to store a program and data, and the processor 901 may perform, based on the program, the method performed by the receive end device in the embodiments of this application.

The transceiver 903 may include a radio frequency unit and an antenna. The radio frequency unit may be configured to: perform conversion between a baseband signal and a radio frequency signal, and process the radio frequency signal. The antenna may be configured to send and receive a radio frequency signal in an electromagnetic wave form. In addition, only the radio frequency unit may be considered as the transceiver 903. In this case, the communication apparatus 900 may include the processor 901, the memory 902, the transceiver 903, and the antenna.

In addition, the communication apparatus 900 may further include an input/output apparatus 904, for example, a touchscreen, a display screen, a keyboard, or another component that may be configured to receive data input by a user and output data to the user. It should be noted that some communication apparatuses may not have the input/output apparatus.

For example, the communication module 801 may have a structure shown in the transceiver 903, that is, includes the radio frequency unit and the antenna. Alternatively, the communication module 801 may include the radio frequency unit. The processing module 802 may include the processor 901, or may include the processor 901 and the memory 902.

Alternatively, the communication apparatus 900 may include a chip. For example, the chip includes the processor 901. In addition, the chip may further include the memory 902 and the transceiver 903, and any two of the memory 902, the transceiver 903, and the processor 901 may be coupled to each other.

Based on the structure shown in FIG. 9, when an embodiment provided in this application is executed, the transceiver 903 may be configured to receive first information by using a serving beam. The first information may be used to indicate a delay compensation parameter corresponding to a target beam, and the serving beam and the target beam are different beams. In addition, the processor 901 may determine, based on the delay compensation parameter corresponding to the target beam and a full timing advance, a differential timing advance corresponding to the target beam.

For example, the first information comes from a network device corresponding to the serving beam.

For example, the serving beam is a beam used by the terminal to currently access the network device, and the target beam is a beam to which the terminal is about to be switched.

In a specific example, the processor 901 may determine the full timing advance based on location information of the terminal and location information of a target satellite. The target satellite corresponds to the target beam, or in other words, the target satellite is a satellite that transmits the target beam. In this example, the transceiver 903 may further receive the location information of the target satellite. For example, the transceiver 903 may receive the location information of the target satellite from the network device.

In another example, the processor 901 may determine the full timing advance based on a delay compensation parameter corresponding to the serving beam and a differential timing advance corresponding to the serving beam.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the transceiver 903 may be configured to receive second information by using a serving beam. The second information may be used to indicate a differential timing advance corresponding to a target beam, and the target beam and the serving beam are different beams. Then, the processor 901 may perform a timing advance based on the differential timing advance corresponding to the target beam.

For example, the second information may come from a network device corresponding to the serving beam.

In a possible example, the transceiver 903 may be further configured to send location information of the terminal to the network device.

In another possible example, the transceiver 903 may be further configured to send a differential timing advance of the serving beam to the network device.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the transceiver 903 may be configured to receive third information by using a serving beam. The third information may be used to indicate a first parameter. In addition, the processor 901 may determine, based on the first parameter and a differential timing advance of the serving beam, a differential timing advance corresponding to a target beam. The serving beam and the target beam are different beams. The first parameter may include a difference between a delay compensation parameter corresponding to the serving beam and a delay compensation parameter corresponding to the target beam. Alternatively, the first parameter may include the delay compensation parameter corresponding to the target beam and the delay compensation parameter corresponding to the serving beam.

For example, the third information comes from a network device corresponding to the serving beam.

The first information may be carried in one or more of signaling such as initial bandwidth part BWP signaling, non-initial BWP signaling, neighboring cell measurement configuration signaling, or inter-cell handover signaling.

Figure 10:
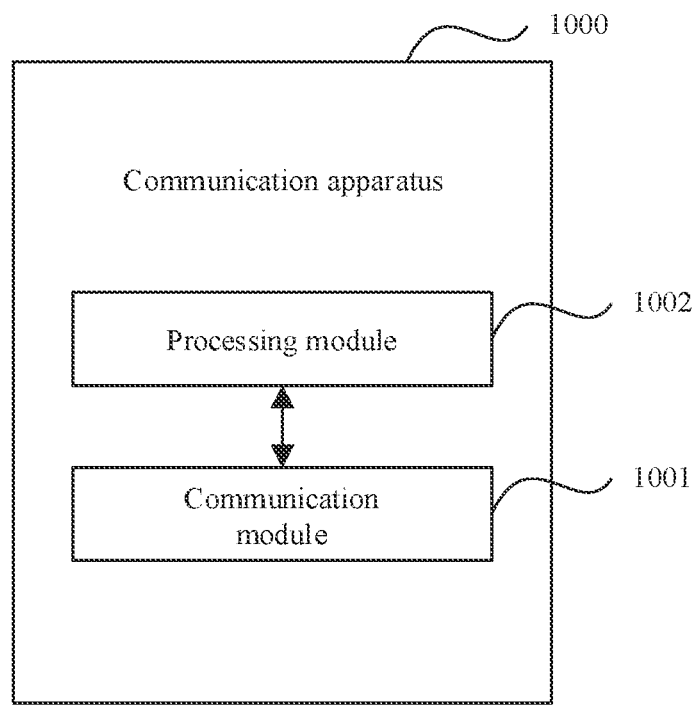
FIG. 10 is a schematic diagram of a structure of a communication apparatus according to an embodiment of this application.

As shown in FIG. 10, a communication apparatus provided in an embodiment of this application may include a communication module 1001 and a processing module 1002. The communication module 1001 and the processing module 1002 are coupled to each other. The communication apparatus 1000 may be configured to perform steps performed by the network device in the foregoing method embodiment. The communication apparatus 1000 may be a satellite that serves as a network device or a ground station that serves as a network device.

The communication module 1001 may be configured to support the communication apparatus 1000 in communication. The communication module 1001 may have a wireless communication function, for example, can communicate with another communication apparatus (for example, a terminal) in a wireless communication manner. The processing module 1002 may be configured to support the communication apparatus 1000 in performing a processing action of the terminal device in the foregoing method embodiment, including, but not limited to, generating information or a message to be sent by the communication module 1001, and/or demodulating and decoding a signal received by the communication module 1001, and the like.

When an embodiment provided in this application is executed, the processing module 1002 may be configured to determine a delay compensation parameter corresponding to a target beam. The delay compensation parameter corresponding to the target beam may be used to determine a differential timing advance corresponding to the target beam. The communication module 1001 may send first information by using a serving beam. The first information may be used to indicate the delay compensation parameter corresponding to the target beam, and the serving beam and the target beam are different beams.

For example, the serving beam is a beam used by the terminal to currently access the network device, and the target beam is a beam to which the terminal is about to be switched.

In a possible example, the communication module 1001 may further send location information of a target satellite to the terminal. The target satellite corresponds to the target beam. For example, when the target beam and the serving beam correspond to different satellites, the communication module 1001 may send the location information of the target satellite.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the processing module 1002 may determine a delay compensation parameter corresponding to a target beam, and determine, based on a full timing advance of the terminal and the delay compensation parameter corresponding to the target beam, a differential timing advance corresponding to the target beam. The communication module 1001 may send second information by using a serving beam. The second information may be used to indicate the differential timing advance corresponding to the target beam.

In a possible example, the communication module 1001 may receive location information from the terminal, and the processing module 1002 may determine the full timing advance of the terminal based on the location information of the terminal and location information of a target satellite. The target satellite corresponds to the target beam. The location information of the terminal may come from the terminal.

In another possible example, the communication module 1001 may receive a differential timing advance of the serving beam, and the processing module 1002 may determine the full timing advance of the terminal based on a delay compensation parameter corresponding to the serving beam and the differential timing advance corresponding to the serving beam. The differential timing advance of the serving beam may come from the terminal.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the processing module 1002 may be configured to determine a first parameter. The first parameter may be used by the terminal to determine a differential timing advance corresponding to a target beam. The communication module 1001 may be configured to send third information by using a serving beam. The third information may be used to indicate the first parameter. The serving beam and the target beam are different beams. The first parameter may include a difference between a delay compensation parameter corresponding to the serving beam and a delay compensation parameter corresponding to the target beam. Alternatively, the first parameter may include the delay compensation parameter corresponding to the target beam and the delay compensation parameter corresponding to the serving beam.

The first information may be carried in one or more of signaling such as initial bandwidth part BWP signaling, non-initial BWP signaling, neighboring cell measurement configuration signaling, or inter-cell handover signaling.

Figure 11:
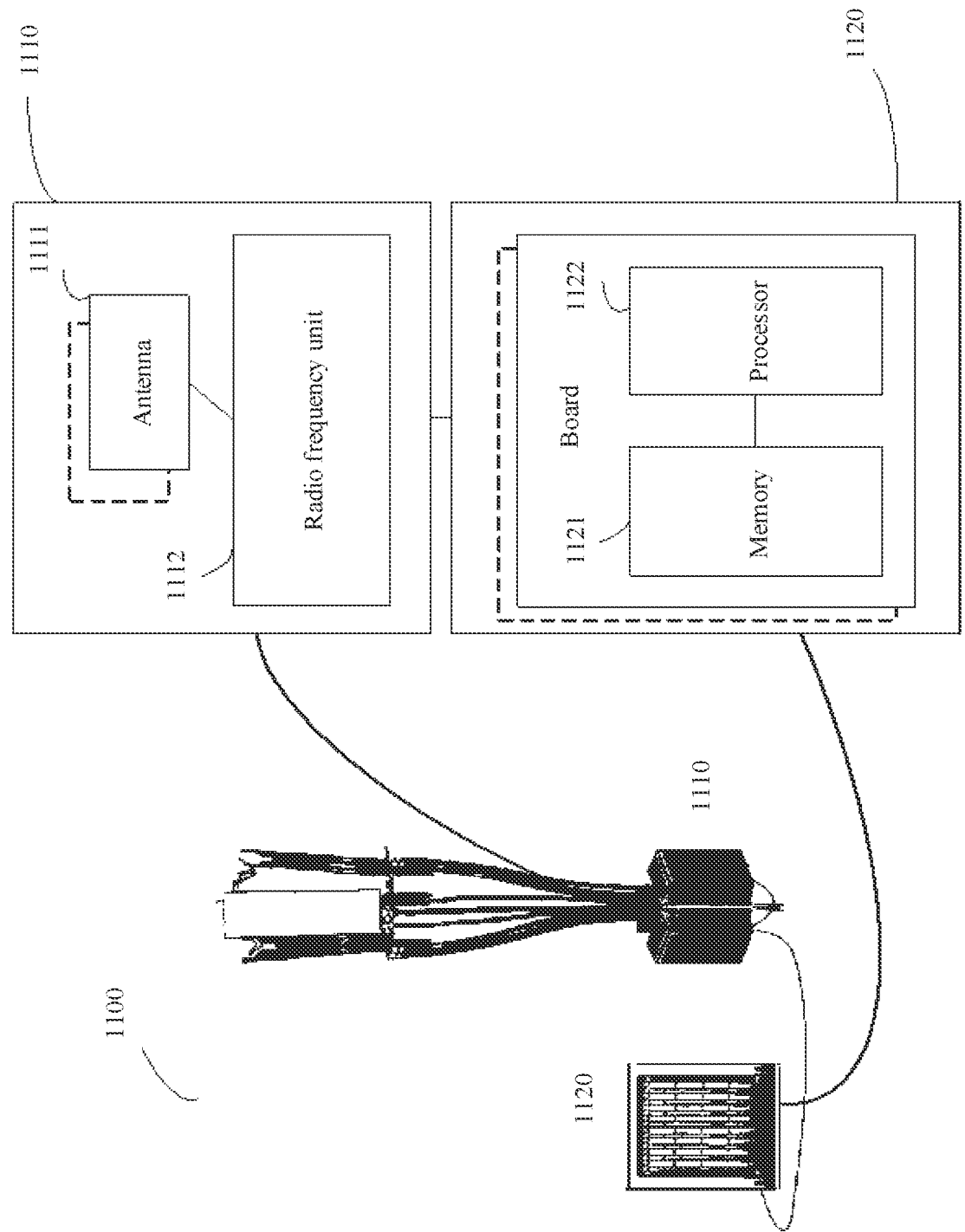
FIG. 11 is a schematic diagram of a structure of a communication apparatus according to an embodiment of this application.

In addition, when the communication apparatus in this embodiment is a network device, the communication apparatus may have a structure shown in FIG. 11. The communication apparatus 1100 shown in FIG. 11 may be a satellite that serves as a network device or a ground station that serves as a network device. The communication apparatus 1100 includes one or more remote radio units (RRU) 1110 and one or more baseband units (BBU) (which may also be referred to as a digital unit (DU) 1120. The RRU 1110 may be referred to as a communication module, may correspond to the communication module 1001 in FIG. 10, and is configured to perform the foregoing steps performed by the communication module 1001. The RRU 1110 may also be referred to as a transceiver, a transceiver circuit, or the like, and may include at least one antenna 1111 and a radio frequency unit 1112. The RRU 1110 is mainly configured to: send and receive a radio frequency signal, and perform conversion between the radio frequency signal and a baseband signal. For example, the RRU 1110 is configured to send a resource indication to a terminal device. It should be understood that the RRU 1110 may be considered as a transceiver, or only the radio frequency unit 1112 may be considered as a transceiver.

The BBU 1120 is mainly configured to perform baseband processing, control a base station, and the like. The RRU 1110 and the BBU 1120 may be physically disposed together, or the RRU 1110 and the BBU 1120 may be physically disposed separately, that is, a distributed base station. The BBU 1120 is a control center of the network device, may also be referred to as a processing module, may correspond to the processing module 1002 in FIG. 10, and is configured to perform the foregoing steps performed by the processing module 1002. The BBU 1120 may be further configured to complete baseband processing functions such as channel coding, multiplexing, modulation, and spectrum spreading. For example, the BBU 1120 may be configured to control the network device to perform an operation procedure related to the network device in the foregoing method embodiment.

In an example, the BBU 1120 may include one or more boards. A plurality of boards may jointly support a radio access network (for example, an LTE network) having a single access standard, or may separately support radio access networks (for example, an LTE network, a 5G network, and another network) having different access standards. The BBU 1120 further includes a memory 1121 and a processor 1122. The memory 1121 is configured to store necessary instructions and necessary data. The processor 1122 is configured to control the network device to perform a necessary action, for example, configured to control the network device to perform an operation procedure performed by the CU and/or the CU in the foregoing method embodiment.

For example, the processor 1122 may perform the foregoing steps performed by the processing module 1702. The memory 1121 and the processor 1122 may serve the one or more boards. In other words, the memory and the processor may be disposed on each board. Alternatively, the plurality of boards may share a same memory and a same processor. In addition, a necessary circuit may be further disposed on each board.

When a first embodiment provided in this application is executed, the processor 1122 may be configured to determine a delay compensation parameter corresponding to a target beam. The delay compensation parameter corresponding to the target beam may be used to determine a differential timing advance corresponding to the target beam. The transceiver (the RRU 1110 or the radio frequency unit 1112) may send first information by using a serving beam. The first information may be used to indicate the delay compensation parameter corresponding to the target beam, and the serving beam and the target beam are different beams.

For example, the serving beam is a beam used by the terminal to currently access the network device, and the target beam is a beam to which the terminal is about to be switched.

In a possible example, the transceiver may further send location information of a target satellite to the terminal. The target satellite corresponds to the target beam. For example, when the target beam and the serving beam correspond to different satellites, the transceiver may send the location information of the target satellite.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the processor 1122 may determine a delay compensation parameter corresponding to a target beam, and determine, based on a full timing advance of the terminal and the delay compensation parameter corresponding to the target beam, a differential timing advance corresponding to the target beam. The transceiver may send second information by using a serving beam. The second information may be used to indicate the differential timing advance corresponding to the target beam.

In a possible example, the transceiver may receive location information from the terminal, and the processor 1122 may determine the full timing advance of the terminal based on the location information of the terminal and location information of a target satellite. The target satellite corresponds to the target beam. The location information of the terminal may come from the terminal.

In another possible example, the transceiver may receive a differential timing advance of the serving beam, and the processor 1122 may determine the full timing advance of the terminal based on a delay compensation parameter corresponding to the serving beam and the differential timing advance corresponding to the serving beam. The differential timing advance of the serving beam may come from the terminal.

The delay compensation parameter corresponding to the target beam may include a delay compensation value of a service link of the target beam and/or a delay compensation value of a feeder link of the target beam. The delay compensation value of the service link of the target beam and the delay compensation value of the feeder link of the target beam may be determined by a network device of the target beam.

The first information may be carried in one or more of signaling such as initial bandwidth part BWP signaling, non-initial BWP signaling, neighboring cell measurement configuration signaling, or inter-cell handover signaling.

When another embodiment provided in this application is executed, the processor 1122 may be configured to determine a first parameter. The first parameter may be used by the terminal to determine a differential timing advance corresponding to a target beam. The transceiver may be configured to send third information by using a serving beam. The third information may be used to indicate the first parameter. The serving beam and the target beam are different beams. The first parameter may include a difference between a delay compensation parameter corresponding to the serving beam and a delay compensation parameter corresponding to the target beam. Alternatively, the first parameter may include the delay compensation parameter corresponding to the target beam and the delay compensation parameter corresponding to the serving beam.

The first information may be carried in one or more of signaling such as initial bandwidth part BWP signaling, non-initial BWP signaling, neighboring cell measurement configuration signaling, or inter-cell handover signaling.

Based on a same concept as the foregoing method embodiments, an embodiment of this application further provides a computer-readable storage medium. The computer-readable storage medium stores a computer program, and when the program is executed by a processor, the computer is enabled to perform an operation performed by the terminal or the network device in any one of the foregoing method embodiments or the possible implementations of the method embodiments.

Based on a same concept as the foregoing method embodiments, this application further provides a computer program product. The computer program product may include instructions, and when the instructions are invoked and executed by a computer, the computer may be enabled to implement an operation performed by the terminal or the network device in any one of the foregoing method embodiments or the possible implementations of the method embodiments.

Based on a same concept as the foregoing method embodiments, this application further provides a chip or a chip system. The chip may include a processor. The chip may further include a memory (or storage module) and/or a transceiver (or communication module), or the chip is coupled to a memory (or storage module) and/or a transceiver (or communication module). The transceiver (or communication module) may be configured to support the chip in wired and/or wireless communication. The memory (or storage module) may be configured to store a program. The processor may invoke the program to implement an operation performed by the terminal or the network device in any one of the foregoing method embodiments or the possible implementations of the method embodiments. The chip system may include the chip, or may include the chip and another discrete component, such as a memory (or storage module) and/or a transceiver (or communication module).

Based on a same concept as the foregoing method embodiments, this application further provides a communication system. The communication system may include the terminal and/or the network device. The communication system may be configured to implement an operation performed by the terminal or the network device in any one of the foregoing method embodiments or the possible implementations of the method embodiments. For example, the communication system may have a structure shown in FIG. 1 or FIG. 2.

Embodiments of this application are described with reference to the flowcharts and/or block diagrams of the method, the apparatus, and the computer program product according to the embodiments. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A communication method, comprising:
   receiving, by a terminal, first information by using a serving beam,
   wherein the first information indicates a delay compensation parameter corresponding to a target beam, and the serving beam and the target beam are different beams;
   determining, by the terminal based on a full timing advance and the delay compensation parameter corresponding to the target beam,
   a differential timing advance corresponding to the target beam; and
   determining, by the terminal, the full timing advance based on location information of the terminal and location information of a target satellite, wherein the target satellite corresponds to the target beam; or
   determining, by the terminal, the full timing advance based on a delay compensation parameter corresponding to the serving beam and
   a differential timing advance corresponding to the serving beam.

2. The communication method according to claim 1, wherein the communication method further comprises:
   receiving, by the terminal, the location information of the target satellite.

3. The communication method according to claim 1, wherein the delay compensation parameter corresponding to the target beam comprises at least one of the following:
   a delay compensation value of a service link of the target beam, wherein the delay compensation value of the service link of the target beam is determined by a network device of the target beam; or
   a delay compensation value of a feeder link of the target beam, wherein the delay compensation value of the feeder link of the target beam is determined by the network device of the target beam.

4. The communication method according to claim 1, wherein the first information is carried in one or more of the following signaling:
   initial bandwidth part (BWP) signaling;
   non-initial BWP signaling;
   neighboring cell measurement configuration signaling; or
   inter-cell handover signaling.

5. A communication apparatus, comprising:
   at least one processor; and
   one or more memories coupled to the at least one processor and storing program instructions for execution by the at least one processor to:
   receive first information by using a serving beam,
   wherein the first information indicates a delay compensation parameter corresponding to a target beam, and the serving beam and the target beam are different beams;
   determine, based on a full timing advance and the delay compensation parameter corresponding to the target beam,
   a differential timing advance corresponding to the target beam; and
   determine the full timing advance based on location information of a terminal and location information of a target satellite, wherein the target satellite corresponds to the target beam; or
   determine the full timing advance based on a delay compensation parameter corresponding to the serving beam and
   a differential timing advance corresponding to the serving beam.

6. The communication apparatus according to claim 5, wherein the one or more memories store the program instructions for execution by the at least one processor to:
   receive the location information of the target satellite.

7. The communication apparatus according to claim 5, wherein the delay compensation parameter corresponding to the target beam comprises at least one of the following:
   a delay compensation value of a service link of the target beam, wherein the delay compensation value of the service link of the target beam is determined by a network device of the target beam; or
   a delay compensation value of a feeder link of the target beam, wherein the delay compensation value of the feeder link of the target beam is determined by the network device of the target beam.

8. The communication apparatus according to claim 5, wherein the first information is carried in one or more of the following signaling:
   initial bandwidth part (BWP) signaling;

non-initial BWP signaling;
neighboring cell measurement configuration signaling; or inter-cell handover signaling.

9. A non-transitory computer readable storage medium, wherein the non-transitory computer readable storage medium stores program instructions for execution by at least one processor to:
receive first information by using a serving beam, wherein the first information indicates a delay compensation parameter corresponding to a target beam, and
the serving beam and the target beam are different beams;
determine based on a full timing advance and the delay compensation parameter corresponding to the target beam and a full timing advance,
a differential timing advance corresponding to the target beam; and
determine the full timing advance based on location information of a terminal and location information of a target satellite, wherein the target satellite corresponds to the target beam; or
determine the full timing advance based on a delay compensation parameter corresponding to the serving beam and
a differential timing advance corresponding to the serving beam.

10. The non-transitory computer readable storage medium according to claim 9, wherein the non-transitory computer readable storage medium stores the program instructions for execution by the at least one processor to:
receive the location information of the target satellite.

11. The non-transitory computer readable storage medium according to claim 9, wherein the delay compensation parameter corresponding to the target beam comprises at least one of the following:
a delay compensation value of a service link of the target beam, wherein the delay compensation value of the service link of the target beam is determined by a network device of the target beam; or
a delay compensation value of a feeder link of the target beam, wherein the delay compensation value of the feeder link of the target beam is determined by the network device of the target beam.

12. The non-transitory computer readable storage medium according to claim 9, wherein the first information is carried in one or more of the following signaling:
initial bandwidth part (BWP) signaling;
non-initial BWP signaling;
neighboring cell measurement configuration signaling; or inter-cell handover signaling.

\* \* \* \* \*